(12) United States Patent
Nakamura et al.

(10) Patent No.: US 7,802,546 B2
(45) Date of Patent: Sep. 28, 2010

(54) VARIABLE VALVE ACTUATING APPARATUS AND PROCESS FOR INTERNAL COMBUSTION ENGINE

(75) Inventors: Makoto Nakamura, Kanagawa (JP); Seinosuke Hara, Kanagawa (JP)

(73) Assignee: Hitachi, Ltd., Tokyo (JP)

(*) Notice: Subject to any disclaimer, the term of this patent is extended or adjusted under 35 U.S.C. 154(b) by 575 days.

(21) Appl. No.: 11/808,320

(22) Filed: Jun. 8, 2007

(65) Prior Publication Data

US 2007/0283911 A1    Dec. 13, 2007

(30) Foreign Application Priority Data

Jun. 12, 2006   (JP)   .............. 2006-161760

(51) Int. Cl.
*F01L 1/34*   (2006.01)
(52) U.S. Cl. .................. 123/90.16; 123/90.15; 123/345
(58) Field of Classification Search ............. 123/90.15, 123/90.16, 90.17, 90.18, 90.27, 90.31, 345, 123/346, 347, 349, 179.18, 319, 322, 685; 464/1, 2, 160
See application file for complete search history.

(56) References Cited

U.S. PATENT DOCUMENTS

| | | | | |
|---|---|---|---|---|
| 6,502,535 B2 * | 1/2003 | Nakamura | ............... | 123/90.15 |
| 6,513,469 B2 * | 2/2003 | Nakamura et al. | ........ | 123/90.15 |
| 7,159,555 B2 * | 1/2007 | Nohara et al. | ........... | 123/179.18 |
| 7,168,402 B2 | 1/2007 | Takemura et al. | | |

FOREIGN PATENT DOCUMENTS

| | | |
|---|---|---|
| JP | 2003 035115 | 2/2003 |
| JP | 2003-172112 | 6/2003 |
| JP | 2005-083238 (A) | 3/2005 |
| JP | 2005-201185 (A) | 7/2005 |
| JP | 2005-226511 (A) | 8/2005 |
| JP | 2005-233049 | 9/2005 |
| JP | 2005-264804 (A) | 9/2005 |
| JP | 2006 029245 | 2/2006 |

* cited by examiner

*Primary Examiner*—Ching Chang
(74) *Attorney, Agent, or Firm*—Foley & Lardner LLP

(57) ABSTRACT

A variable valve actuating apparatus for an internal combustion engine includes a first valve actuating mechanism to vary a first valve operating condition, and a second valve actuating mechanism to vary a second valve operating condition. A controller controls the first valve actuating mechanism to satisfy a predetermined engine starting condition before a start of a cranking operation or during the cranking operation, with respect to an engine operating condition including the second valve operating condition controlled by the second valve actuating mechanism.

21 Claims, 15 Drawing Sheets

ROTATIONAL DIRECTION OF TIMING SPROCKET (ADVANCE DIRECTION)

VARIABLE VALVE ACTUATING APPARATUS AND PROCESS FOR INTERNAL COMBUSTION ENGINE

BACKGROUND OF THE INVENTION

The present invention relates to variable valve operating apparatus suitable for improving engine starting performance.

There is a demand for accurate control of a valve timing (opening timing and/or closing timing) of an engine valve, especially of an intake valve at an initial stage of an engine starting operation, for recent stringent regulations against exhaust emission, and increase of frequency of engine restarts in a hybrid vehicle.

To this end, there are proposed various valve actuating apparatus for controlling the opening and closing timings of an engine valve in accordance with an engine operating condition by varying a relative rotational phase between a timing sprocket and a vane fixed to a camshaft by the use of oil pressure.

In the case of such a hydraulic actuating mechanism, when the engine speed is very low as in an engine starting operation, a control oil pressure is low and the hydraulic power for changeover is insufficient. Moreover, the actuating mechanism tends to receive an urging force in the direction to the retard side, opposite to the cranking rotational direction, and to suffer friction in various parts. Consequently, the changeover response speed to the advance side is liable to be low.

A published Japanese patent application publication number 2005-233049 shows a variable valve actuating system including a phase varying mechanism which is provided on an intake valve's side, and arranged to fix a vane at a relatively advanced position with a lock pin at the time of stop of the engine, and to enable a restart of the engine from the relatively advance position. The thus-constructed variable valve actuating system is expected to stabilize the combustion by providing an adequate valve overlap between the exhaust and intake valves, and setting the intake valve closing time closer to the bottom dead center improve the engine starting performance, and thereby to reduce cold engine emission and improve the engine starting performance.

SUMMARY OF THE INVENTION

However, in the variable valve actuating system of the above-mentioned patent document, it is difficult to lock the vane reliably by aligning the lock pin with a lock hole in various engine stopping situations such as hard braking and engine stall. Accordingly, this system may allow unstable behavior of the vane after a stop of the engine, and may be unable to reduce the emission sufficiently in a cold start of the engine.

Moreover, if the engine is not cold but warm at the time of a next engine restart, even if the lock pin is engaged in the lock hole, an idling operation of the engine may be unstable because of a large valve overlap despite engagement between the lock pin and the lock hole.

It is, therefore, a main object of the present invention to provide variable valve actuating apparatus and/or process to improve the startability or starting performance of an engine more reliably.

According to one aspect of the invention, a variable valve actuating apparatus for an internal combustion engine, comprises: a first valve actuating mechanism to vary a first valve operating condition of the engine; a second valve actuating mechanism to vary a second valve operating condition of the engine; and a controller to control the first valve actuating mechanism to satisfy a predetermined engine starting condition of the engine before an end of a cranking operation of the engine, with respect to an engine operating condition of the engine including the second valve operating condition controlled by the second valve actuating mechanism.

According to still another aspect of the present invention, a variable valve actuating apparatus for an internal combustion engine, comprises: a first valve actuating mechanism to vary a first valve operating condition of the engine; a second valve actuating mechanism to vary a second valve operating condition of of the engine; and a controller to detect an actuating position of the second valve actuating mechanism, to determine a desired target position of the first valve actuating mechanism in accordance with the actuating position of the second valve actuating mechanism so as to improve a startability of the engine, to control the first valve actuating mechanism to the target position, and to crank the engine after an operation to control the first valve actuating mechanism to the target position.

According to still another aspect of the present invention, a control process of controlling a variable valve actuating apparatus including a first valve actuating mechanism to vary a first valve operating condition of an internal combustion engine, and a second valve actuating mechanism to vary a second valve operating condition of of the engine, the control process comprises: a first process element of detecting an actuating position of the second valve actuating mechanism; a second process element of determining a desired target position of the first valve actuating mechanism in accordance with the actuating position of the second valve actuating mechanism so as to improve a startability of the engine; a third process element of controlling the first valve actuating mechanism to the target position; and a fourth process element of allowing a cranking operation of the engine after an operation to control the first valve actuating mechanism to the target position.

DETAILED DESCRIPTION OF THE INVENTION

Figure 1:
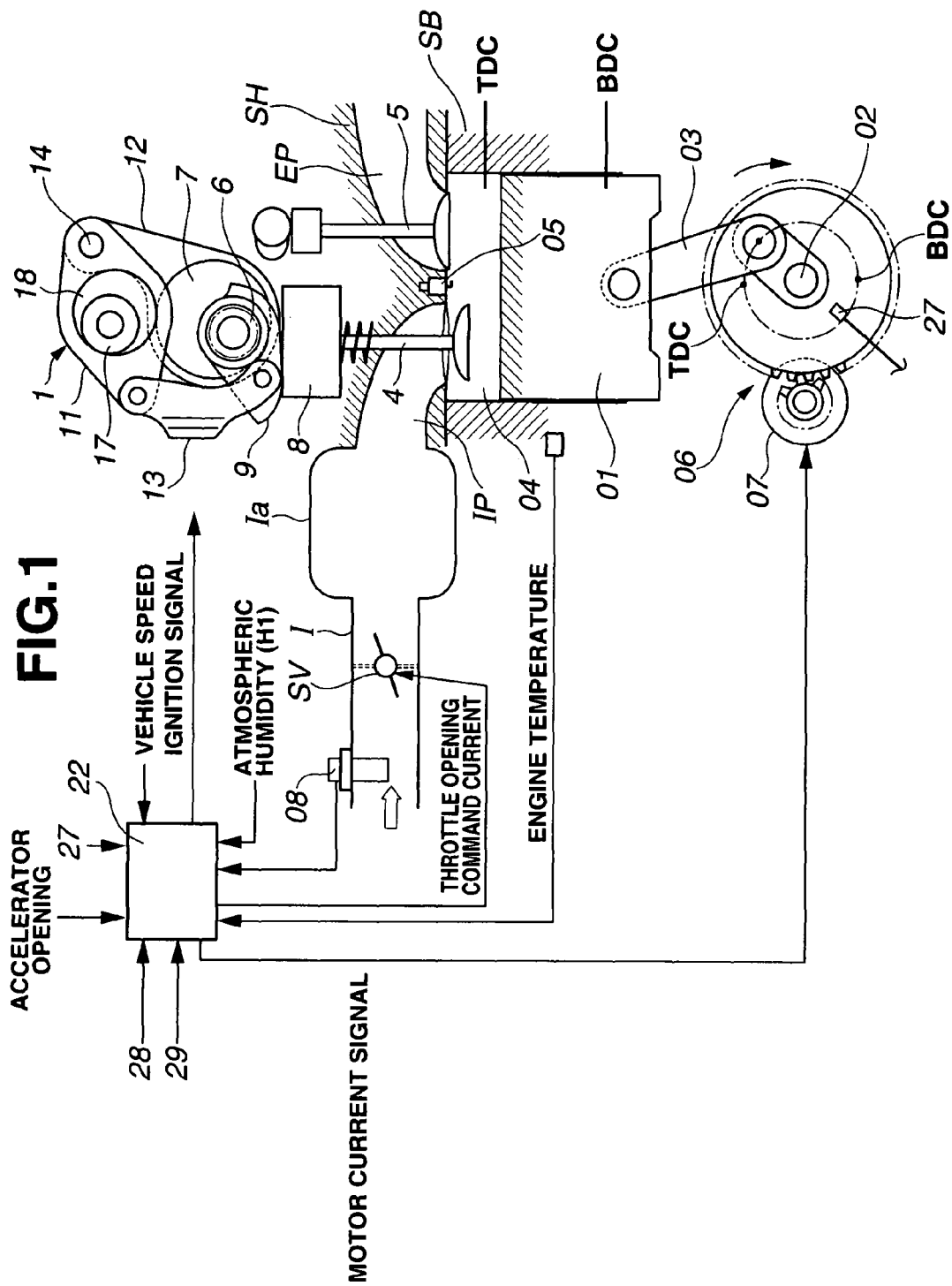
FIG. 1 is a schematic view showing an engine system including a variable valve actuating system or apparatus according to a first embodiment of the present invention.

FIG. 1 schematically shows an engine system including a variable valve actuating system or apparatus according to a first embodiment of the present invention. In this embodiment, the internal combustion engine is a four-cycle multi-cylinder internal combustion engine, and the variable valve actuating system is applied to the intake valve's side.

A cylinder bore shown in FIG. 1 is formed in a cylinder block SB of the engine. A piston 01 is received in this cylinder bore so that piston 01 can slide up and down in the cylinder bore. Intake and exhaust ports IP and EP are formed in a cylinder head SH. For each cylinder, there are provided a pair of intake valves 4, and a pair of exhaust valves 5 for opening and closing the respective open ends of the intake and exhaust ports. Piston 01 is connected with a crankshaft 02 through a connecting rod 03. A combustion chamber 04 is formed between the crown of piston 01 and a lower surface of cylinder head SH.

In an intake passage I on the upstream side of an intake manifold Ia, there is provided a throttle valve SV for controlling the quantity (intake air quantity) of air inducted into the combustion chamber 04. On the downstream side, there is provided a fuel injector (not shown). A spark plug 05 is provided in cylinder head SH substantially at the center of the combustion chamber 04. An electric starter motor 07 is connected with the crankshaft 02 through a pinion gear mechanism 06, and arranged to rotate the crankshaft 02 in the forward or reverse direction.

A variable valve actuating mechanism includes a valve lift varying mechanism (VEL) 1 (which can serve as a first valve actuating mechanism) to control the valve lift and operation angle (opening period) of both intake valves 4; and a valve timing control mechanism (VTC) or variable valve timing mechanism 2 (which can serve as a second valve actuating mechanism) to control a lift phase of the intake valves 4.

The valve lift varying mechanism 1 has the construction substantially the same as the construction disclosed in a published Japanese patent application publication No. 2003-172112. Valve lift varying mechanism 1 includes a hollow drive shaft 6 which is rotatably supported by bearings on an upper part of cylinder head SH; a drive cam 7 which is an eccentric rotary cam fixedly mounted on drive shaft 6 by press fitting in this example; a pair of swing cams 9 which are swingabilly mounted on drive shaft 6, and arranged to open the intake valves 4, respectively, by sliding on top surfaces of valve lifters 8 provided in the upper ends of intake valves 4; and a linkage or motion transmitting mechanism arranged to transmit rotation of drive cam 7 to swing cams 9 for swing motion.

Figure 2:
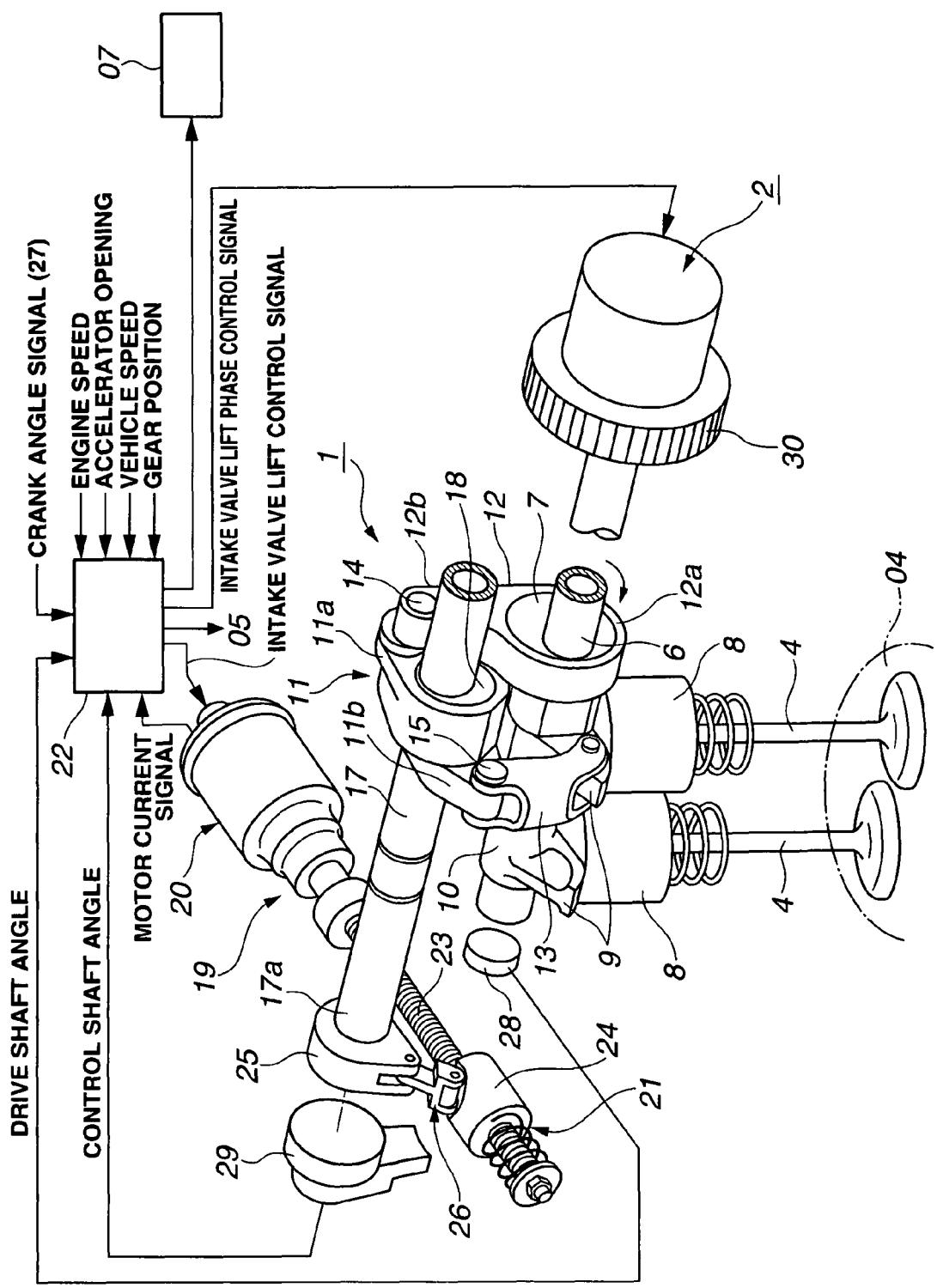
FIG. 2 is a perspective view showing a valve lift varying mechanism and a valve timing control mechanism in the variable valve actuating system of FIG. 1.

Drive shaft 6 is arranged to receive rotation from the crankshaft of the engine through a rotation transmitting mechanism which, in this example, is a chain drive including a timing sprocket 30 provided on one end of drive shaft 6, a driving sprocket provided on the crankshaft, and a timing chain (not shown). When driven by the crankshaft, the drive shaft 6 rotates in the clockwise direction as shown by an arrow in FIG. 2.

Drive cam 7 is shaped like a ring, and formed with a drive shaft receiving hole. Drive cam 7 is fixedly mounted on drive shaft 6 extending through the drive shaft receiving hole. The axis of drive cam 7 is offset in the radial direction from the axis of drive shaft 6 by a predetermined distance.

Swing cams 9 are both shaped identically like a raindrop, and formed integrally at both ends of an annular camshaft 10. The cam shaft 10 is hollow and rotatably mounted on drive shaft 6. Each swing cam 9 has a lower surface including a cam surface 9a. Cam surface 9a includes a base circle surface region on the cam shaft's side, a ramp surface region extending like a circular arc from the base circle surface region toward a cam nose, and a lift surface region extending from the ramp surface region toward an apex of the cam nose to provide a greatest lift. The cam surface abuts on the top surface of the corresponding valve lifter 8 at a predetermined position, and the contact point of the cam surface shifts among the base circle surface region, ramp surface region and lift surface region in dependence on the swing position of the swing cam 9.

The above-mentioned linkage or transmitting mechanism includes a rocker arm 11 disposed above drive shaft 6; a link arm 12 connecting a first end portion 11a of the rocker arm 11 with drive cam 7; and a link rod 13 connecting a second end portion 11b of rocker arm 11 with one swing cam 9.

Rocker arm 11 includes a tubular central base portion formed with a support hole, and rotatably mounted on a control cam 18. The first end portion 11a of rocker arm 11 is connected rotatably with link arm 12 by a pin 14, and the second end portion 11b is connected rotatably with a first end portion 13a of link rod 13 by a pin 15.

Link arm 12 includes a relatively large annular base portion 12a and a projection 12b projecting outward from the base portion 12a. Base portion 12a is formed with a center hole in which the cam portion of the drive cam 7 is rotatably fit. The projection 12b is connected rotatably with the first end portion 11a of rocker arm 11 by a pin 14.

Link rod 13 includes a second end 13b which is connected rotatably with the cam nose of swing cam 9 by the pin 16.

Control shaft 17 is rotatably supported by the same bearings at a position just above drive shaft 6; and control cam 18 is fixedly mounted on control shaft 17 and fit slidably in the support hole of rocker arm 11 to serve as a fulcrum for the swing motion of rocker arm 11.

Control shaft 17 extends in parallel to drive shaft 6 in the longitudinal direction of the engine, and is controlled by a drive mechanism 19. Control cam 18 is shaped like a hollow cylinder, and the axis of control cam 18 is offset from the axis of the control shaft 17 by a predetermined amount.

Drive mechanism 19 includes an electric motor 20 which is fixed to one end of a housing; and a transmission mechanism 21 to transmit rotation of the motor 20 to the control shaft 17. In this example, the transmission mechanism 21 is a ball screw transmission mechanism.

Electric motor 20 of this example is a proportional type DC motor. Electric motor 20 is controlled by a controller 22 in accordance with an engine operating condition.

Controller 22 is connected with various sensors to collect information on a current engine operating state. Controller 22 receives an output signal from a crank angle sensor 27 for sensing a current engine speed N (rpm) from the crank angle, and a signal from an air flowmeter for sensing an intake air quantity (load). Controller 22 is further connected with an accelerator opening sensor for sensing an accelerator opening degree, a vehicle speed sensor, a gear position sensor, and an engine temperature sensor for sensing an engine temperature T1 by sensing the temperature of engine cooling water. Furthermore, controller 22 receives a sensor signal from a drive shaft angle sensor 28 for sensing the rotational angle of drive shaft 6; and a humidity signal representing an atmospheric humidity H1 sensed by an atmospheric humidity sensor.

Ball screw transmission mechanism 21 includes a ball screw shaft 23, a ball nut 24, a connection arm 25 and a link member 26. Ball screw shaft 23 and the drive shaft of motor 20 are arranged end to end and aligned with each other so that their axes form a substantially straight line. Ball nut 24 serves as a movable nut screwed on the ball screw shaft 23 and arranged to move axially in accordance with the rotation. Connection arm 25 is connected with one end portion of control shaft 17. Link member 26 connects the connection arm 25 and ball nut 24.

Ball screw shaft 23 is formed with an external single continuous ball circulating groove extending, in the form of a helical thread of a predetermined width, over the outside surface of ball screw shaft 23 excepting both end portions. Ball screw shaft 23 and the drive shaft of motor 20 are connected end to end by a coupling member which transmits a rotational driving force from motor 20 to ball screw shaft 23, and allow ball screw shaft 23 to move axially to a limited small extent.

Ball nut 24 is approximately in the form of a hollow cylinder. Ball nut 24 is formed with an internal guide groove designed to hold a plurality of balls in cooperation with the ball circulating groove of ball screw shaft 23 so that the balls can roll between the guide groove and the circulating groove. This guide groove is a single continuous helical thread formed in the inside circumferential surface of ball nut 24. Ball nut 24 is arranged to translate the rotation of ball screw shaft 23 into a linear motion of ball nut 24 and produce an axial force. A coil spring 21 is provided to urge the ball nut 24 axially toward electric motor 20, and thereby to eliminate a backlash clearance with ball screw shaft 23.

The thus-constructed valve lift varying mechanism is operated in the following manner. In a predetermined engine operating region, the controller 22 acts to move the ball nut 24 rectilinearly toward motor 20, by sending control current to motor 20 and rotating the ball screw shaft 23 with motor 20. With this movement of ball nut 24, the control shaft 17 is rotated in one direction by the link member 39 and connection arm 25.

Figure 3A:
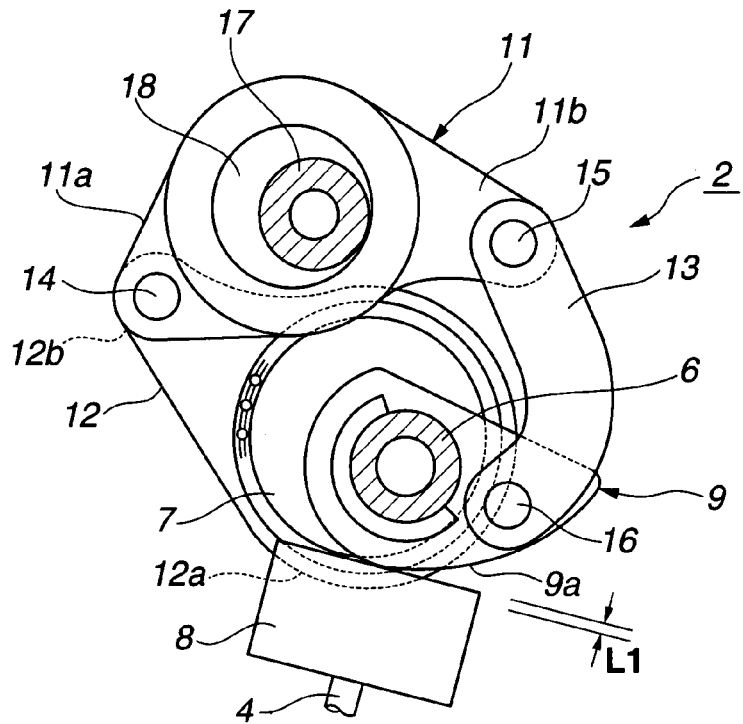
FIGS. 3A and 3B are views for illustrating operation of the valve lift varying mechanism in a small lift control state.
Figure 3B:
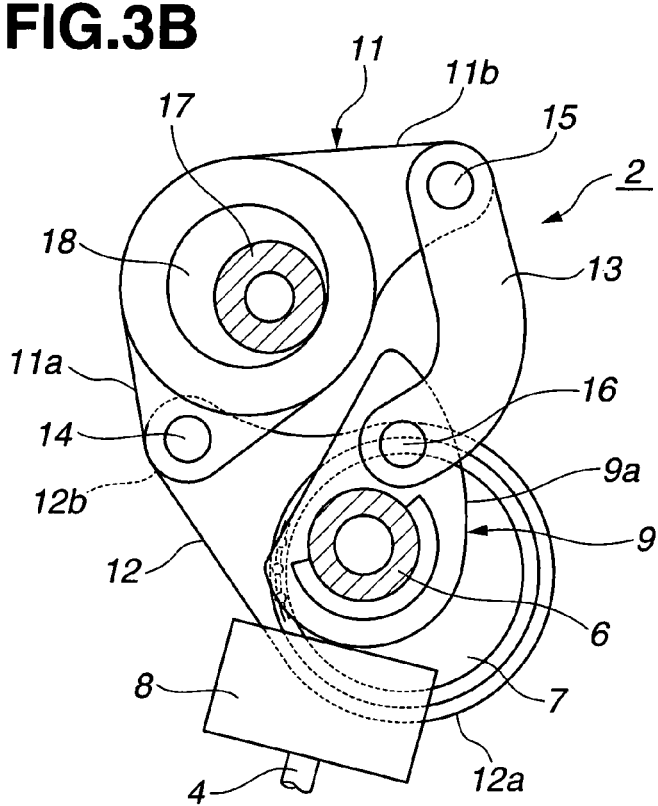

Therefore, control cam 18 rotates about the axis of control shaft 17 so that the axis of control cam 18 rotates about the axis of control shaft 17, as shown in FIGS. 3A and 3B (in the form of rear view), and a thick wall portion is shifted upwards from drive shaft 6. As a result, the pivot point between the second end portion 11b of rocker arm 11 and link rod 13 is shifted upwards relative to the drive shaft 6. Therefore, each swing cam 9 is rotated in the counterclockwise direction as viewed in FIGS. 3A and 3B, and the cam nose is pulled upwards by link rod 13.

Accordingly, drive cam 7 rotates and pushes up the end 11a of rocker arm 11 through link arm 12. Though a movement for valve lift is transmitted through link rod 13 to swing cam 9 and valve lifter 16, the valve lift quantity is decreased sufficiently to a small valve lift L1 shown by a valve lift curve in FIG. 5, and the operation angle D is decreased to a small value D1 (valve opening period).

Therefore, the variable valve actuating system can provide the effect of decompression, the effect of small lift and low friction, and the effect of reduction of fuel consumption.

In another engine operating region, the controller 22 drives motor 20 in a reverse rotational direction, and thereby rotates the ball screw shaft 23 in the reverse direction. With this reverse rotation, the ball nut 24 moves in the axial direction away from motor 20, and control shaft 17 is rotated in the counterclockwise direction as viewed in FIGS. 3A and 3B by a predetermined amount. Therefore, the control cam 18 is held at the angular position at which the axis of control cam 18 is shifted downward by a predetermined amount from the axis of control shaft 17, and the thick wall portion is shifted downwards. Rocker arm 11 is moved in the clockwise direction from the position of FIGS. 3A and 3B, and the end of rocker arm 11 pushes down the cam nose of swing cam 9 through link member 13, and swing cam 9 rotates in the clockwise direction slightly.

Accordingly, drive cam 7 rotates and pushes up the end 11a of rocker arm 11 through link arm 12. A movement for valve lift is transmitted through link member 13 to swing cams 9 and valve lifters 8. In this case, the valve lift quantity is increased to a medium lift L2, and the operation angle is increased to a medium angle D2. By this control operation, the variable valve actuating system can shift the intake valve closing timing on the retard side toward the bottom dead center. By so doing, the variable valve actuating system can improve the combustion in a cold start operation with a higher effective compression ratio, and increase the fresh air charging efficiency to increase the combustion torque.

In a low speed low load region after a warm-up of the engine, the variable valve actuating system can control the valve lift to the small level L1, and perform a retard control with valve timing control mechanism 2. In this case, the variable valve actuating system can stabilize the combustion by decreasing the valve overlap, and improve the fuel consumption by decreasing the friction for actuating the valves in the small lift.

In a medium load region, the variable valve actuating system can control the valve lift to a level at or near the medium lift L2 and perform an advance control with valve timing control mechanism 2. In this case, the variable valve actuating system can decrease the pumping loss and improve the fuel consumption by increasing the valve overlap.

Figure 4A:
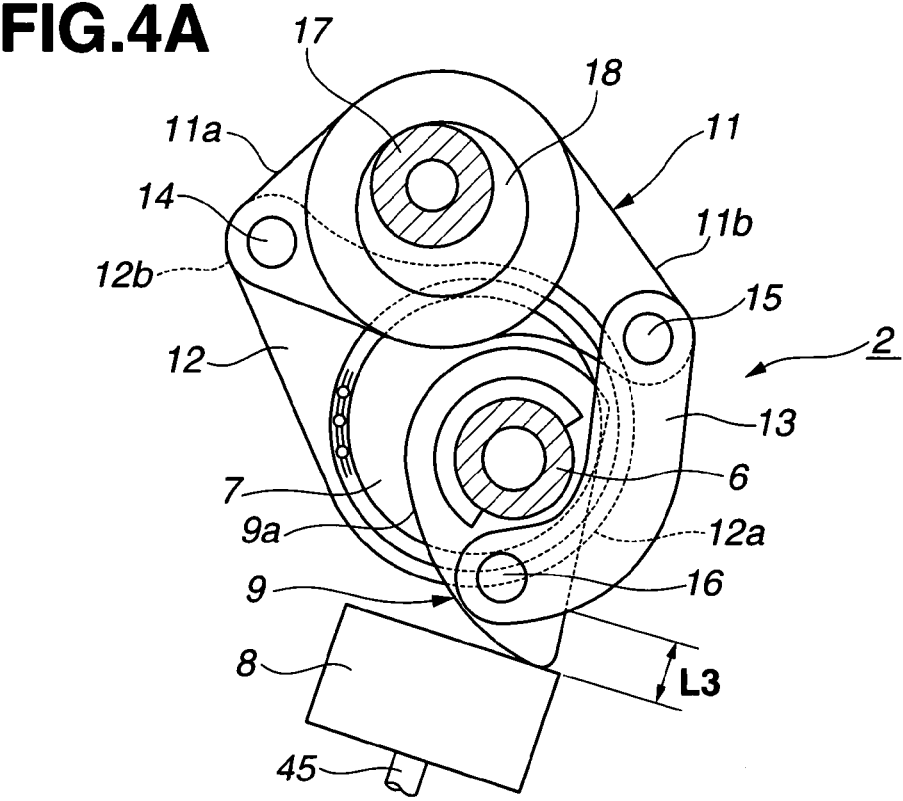
FIGS. 4A and 4B are views for illustrating operation of the valve lift varying mechanism in a greatest lift control state.
Figure 4B:
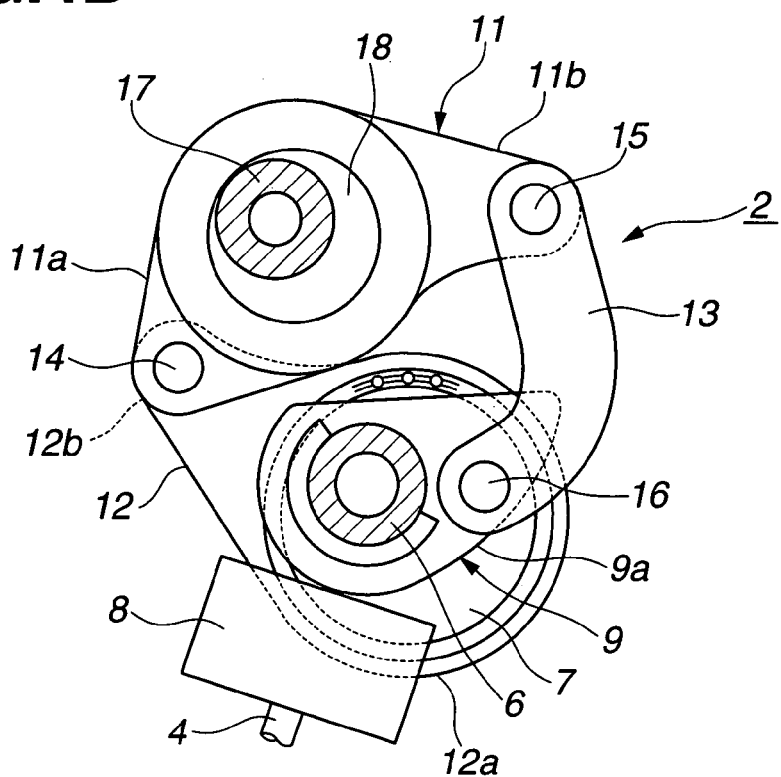

When the engine operating point enters a high speed, high load region, this variable valve actuating system can rotate motor 20 in the reverse direction by sending the control signal from controller 22, to rotate control cam 18 further in the counterclockwise direction with control shaft 17 to the position at which the axis is rotated downwards as shown in FIGS. 4A and 4B. Therefore, rocker arm 11 moves to a position closer to the drive shaft 6, and the second end 11b pushes down the cam nose of swing cam 9 through link rod 13, so that the swing cam 9 is further rotated in the clockwise direction by a predetermined amount.

Figure 5:
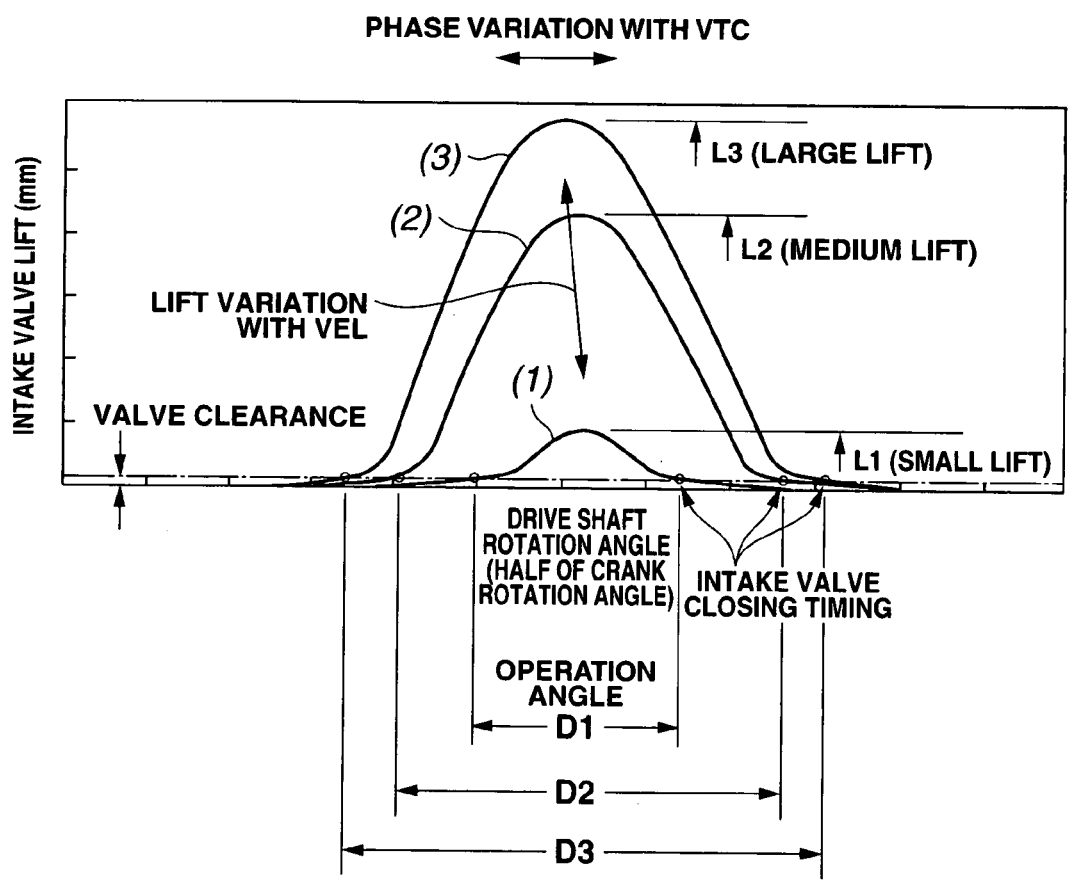
FIG. 5 is a graphic diagram illustrating the valve lift (quantity), operation angle and valve timing of an intake valve in the variable valve actuating system of FIG. 1.

Accordingly, drive cam 7 rotates and pushes up the first end 11a of rocker arm 11 through link arm 12. A movement for valve lift is transmitted through link rod 13 to swing cam 9 and valve lifter 8. In this case, the valve lift quantity is increased continuously from L2 to L3 as shown in FIG. 5. In this way, this system can improve the intake charging efficiency and the engine output in the high speed region.

In this way, this variable valve actuating mechanism 1 is arranged to vary the valve lift (quantity) of the engine valve (which, in this example, includes intake valves 4) continuously from the small lift L1 to the large lift L3 in accordance with one or more engine operating conditions. Accordingly, the operation angle of the engine valve is varied continuously from the small angle (angular distance) D1 to the large angle D3.

Figure 6:
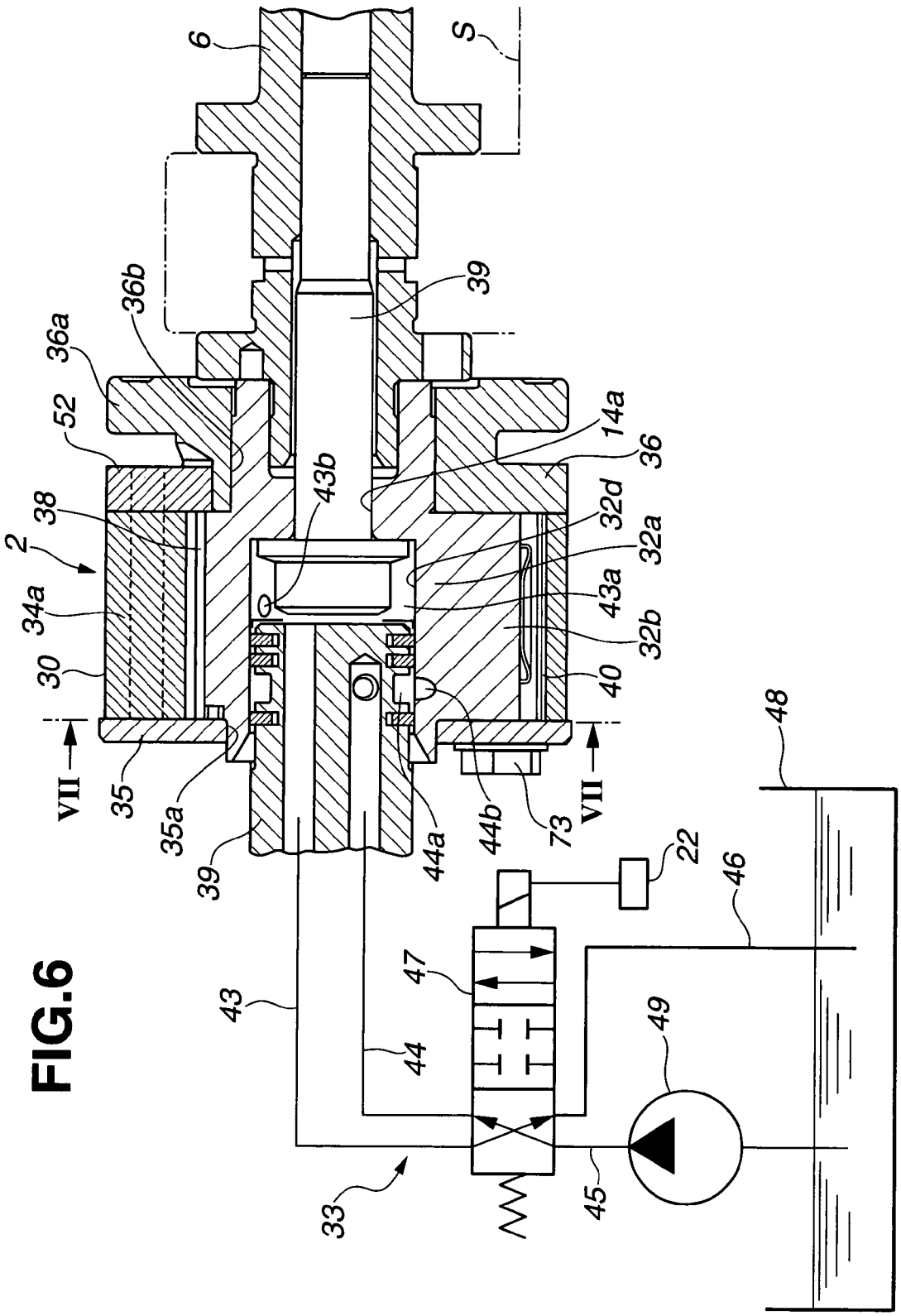
FIG. 6 is a sectional view of the valve timing control mechanism in the variable valve actuating system of FIG. 1.
Figure 7:
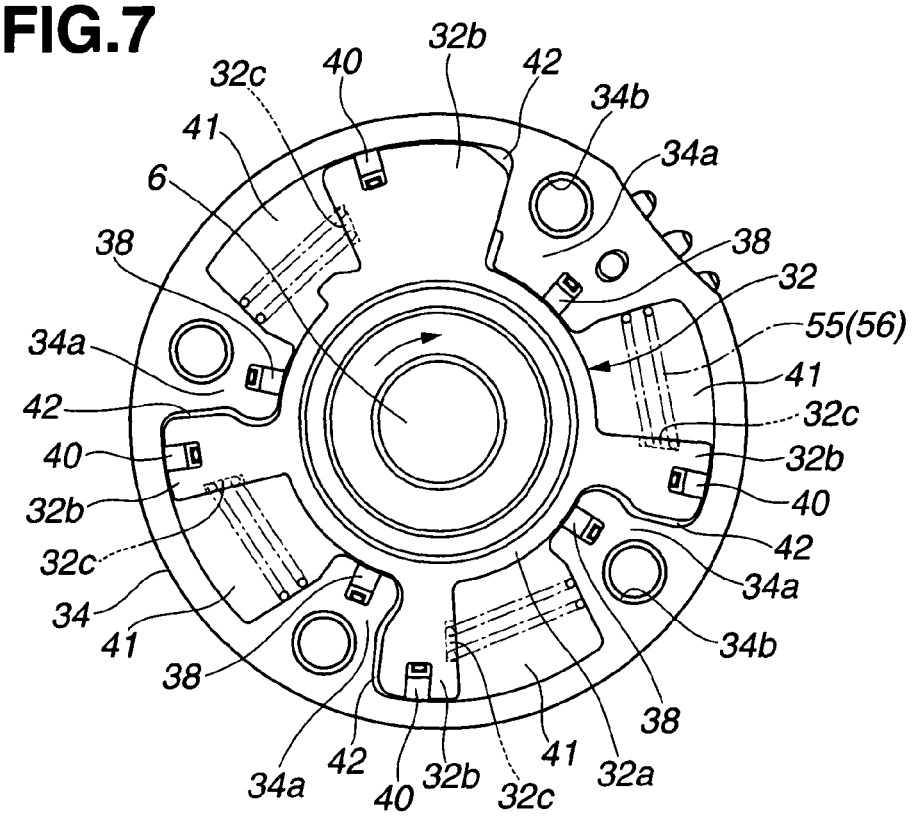
FIG. 7 is a sectional view, taken across a line VII-VII show in FIG. 6, for showing the valve timing control mechanism in a most advanced control state.

As shown in FIGS. 6 and 7, the valve timing control mechanism 2 of this example is a vane type mechanism including a timing sprocket 30 for transmitting rotation to drive shaft 6; a vane member 32 which is fixed to one end of drive shaft 6 and received rotatably in the timing sprocket 30; and a hydraulic circuit 33 to rotate vane member 32 in the forward and reverse directions by the use of an oil pressure.

Timing sprocket 30 includes a housing 34 receiving the vane member 32 rotatably; a front cover 35 shaped like a circular disk and arranged to close a front opening of housing 34; and a rear cover 36 shaped approximately like a circular disk and arranged to close a rear opening of housing 34. Housing 34 is sandwiched between front and rear covers 35 and 26, and joined with these covers to form a unit, by four small diameter bolts 37 extending in the axial direction of drive shaft 6.

Housing 34 is in the form of a hollow cylinder having the front and rear openings. Housing 34 includes a plurality of shoes 34a projecting radially inwards from the inside circumferential surface and serving as a partition. In this example, four of the shoes 34a are arranged at intervals of about 90°.

Each shoe 34a has an approximately trapezoidal cross section. A bolt hole 34b is formed approximately at the center of each shoe 34a. Each bolt hole 34b passes axially through one of shoes 34a, and receives the shank of one of the axially extending bolts 37. Each shoe 34a includes an inner end surface. A retaining groove extends axially in the form of cutout in the inner end surface of each shoe at a higher position. A U-shaped seal member 38 is fit in each retaining groove, and urged radially inwards by a leaf spring (not shown) fit in the retaining groove.

Front cover 35 includes a center support bolt hole 35a having a relatively large inside diameter; and four bolt holes (not shown) each receiving one of the axially extending bolts 37. These four bolt holes are arranged around the center bolt hole 35a.

Rear cover 36 includes a toothed portion 36a formed integrally on the rear side, and arranged to engage with the before-mentioned timing chain; and a center bearing hole 36b having a relatively large inside diameter and extending axially through rear cover 36.

Vane member 32 includes a central vane rotor 32a and a plurality of vanes 32b projecting radially outwards from the vane rotor 32a. In this example, four of the vanes 32b are arranged at angular intervals of approximately 90° circumferentially around vane rotor 32a. Vane rotor 32a is annular and includes a center bolt hole at the center. Vanes 32b are integral with vane rotor 32a.

The vane rotor 32a includes a front side small diameter tubular portion supported rotatably by the center support hole 35a of front cover 35, and a rear side small diameter tubular portion supported rotatably by the bearing hole 36b of rear cover 36.

Vane member 32 is fixed to the front end of drive shaft 6 by a fixing bolt 39 extending axially through the center bolt hole of vane rotor 32a.

Three of the four vanes 32b are smaller vanes shaped approximately like a relatively long rectangle, and the remaining one is a larger vane shaped like a relatively large trapezoid. The smaller vanes 32b are approximately equal in circumferential width whereas the larger vane 32b has a larger circumferential width greater than that of each of the smaller vanes 32b so that a weight balance is attained as a whole of vane member 32.

Figure 8:
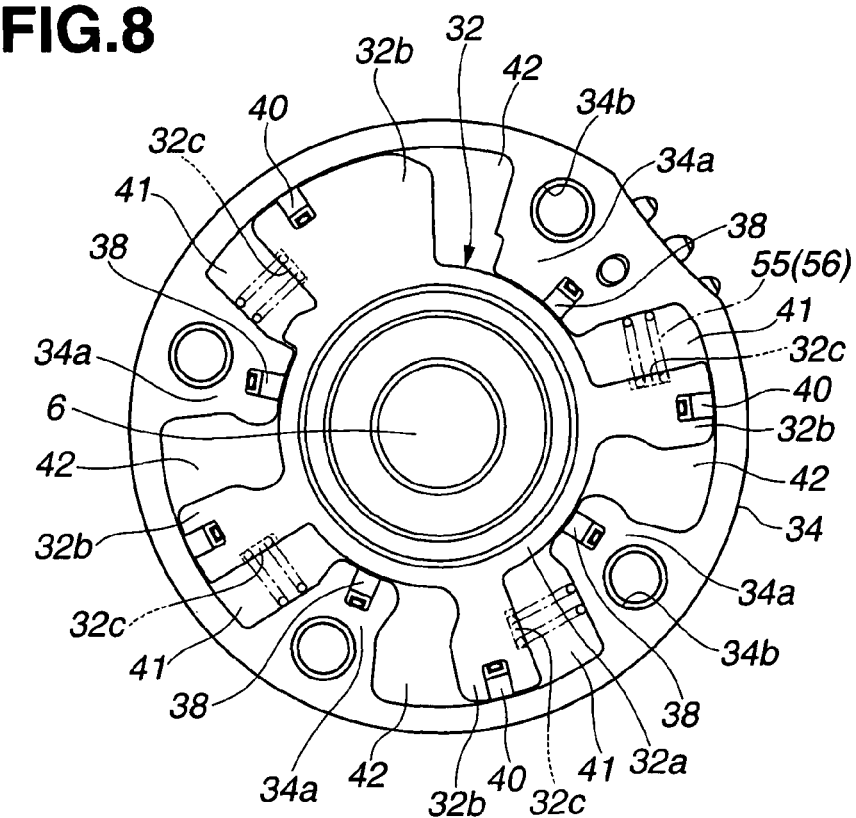
FIG. 8 is a sectional view, taken across a line VII-VII show in FIG. 6, for showing the valve timing control mechanism in a most retarded control state.

The four vanes 32b of vane member 32 and the four shoes 34a of housing 34 are arranged alternately in the circumferential direction around the center axis, as shown in FIGS. 7 and 8. Each vane 32b includes an axially extending retaining groove receiving a U-shaped seal member 40 in sliding contact with the inside cylindrical surface of housing 34, and a leaf spring (not shown) for urging the seal member 40 radially outwards and thereby pressing the seal member 40 to the inside cylindrical surface of housing 34. Moreover, in one side of each vane 32b facing in the direction opposite to the rotational direction of drive shaft 6, there are formed with two circular recessed 32c.

An advance fluid pressure chamber 41 and a retard fluid pressure chamber 42 are formed on both sides of each vane 32b. Accordingly, there are four of the advance chambers 41 and fourth of the retard chambers 42.

Hydraulic circuit 33 includes a first fluid pressure passage 43 leading to the advance chambers 41 to supply and drain an advance fluid pressure of an operating oil to and from advance chambers 41; a second fluid pressure passage (or retard fluid pressure passage) 44 leading to the retard chambers 42 to supply and drain a retard fluid pressure of the operating oil to and from retard chambers 44, and a directional control valve or selector valve 47 connecting the first pressure passage 43 and second pressure passage 44 selectively with a supply passage 45 and a drain passage 46. In this example, control valve 47 is a solenoid valve. A fluid pump 49 is connected with supply passage 45, and arranged to draw the hydraulic operating fluid or oil from an oil pan 48 of the engine, and to force the fluid into supply passage 45. Pump 49 is a one-way type pump. The downstream end of drain passage 46 is connected to oil pan 48, and arranged to drain the fluid to oil pan 48.

First and second pressure passages 43 and 44 includes sections formed in a cylindrical portion 39 which is inserted, from a first end, through the small diameter tubular portion of vane rotor 32a, into the support hole 32d of vane rotor 32a. A second end of the cylindrical portion 39 is connected with solenoid selector valve 47.

Between the outside circumferential surface of the cylindrical portion 39 and the inside circumferential surface of support hole 14d, there are provided three annular seal members 27 fixedly mounted on the cylindrical portion 39 near the forward end and arranged to seal the first and second pressure passages 43 and 44 off from each other.

First fluid pressure passage 43 includes a passage section 43a serving as a pressure chamber, and four branch passages 43b connecting the passage section 43a, respectively, with the fourth advance chambers 41. Passage section 43a is formed in an end portion of support hole 32d on the side of drive shaft 6. The four branch passages 43b are formed in vane rotor 32a and extend radially in vane rotor 32a.

Second fluid pressure passage 44 includes an axially extending passage section extending axially in the cylindrical portion 39 to a closed end; an annular chamber 44a formed around the axially extending passage section near the closed end; and a L-shaped passage section 44b connecting the annular chamber 44a with each retard pressure chamber 42.

Directional control valve 47 of this example is a solenoid valve having four ports and three positions. A valve element inside the control valve 47 is arranged to alter the connection between the passages 43 and 44 and the supply and drain passages 45 and 46 under the control of the controller 22.

Controller 22 produces a control signal, and controls the solenoid control valve 47 by sending the control signal to the valve 47. Controller 22 of this example is a common control unit used for controlling both the valve lift varying mechanism 1 and valve timing control mechanism 2. Controller 22 is configured to sense the engine operating conditions and sense the relative rotational position between timing sprocket 30 and drive shaft 6 from the sensor signals from the crank angle sensor 27 and drive shaft angle sensor 28.

By setting solenoid selector valve 47 to a neutral position, this control system does not supply the operating oil positively to the advance and retard chambers 41 and 42 at the time of engine starting operation.

Between one side surface of each vane 32b and a confronting side surface 10b of an adjacent one of the shoes 34a, there are disposed a pair of coil springs 55 and 56 serving as biasing means for urging the vane member 32 in the advance rotational direction.

Though the two coil springs 55 and 56 are overlapped in FIGS. 7 and 8, the two coil springs 55 and 56 extend separately in parallel to each other. The two coil springs 55 and 56 have an equal axial length (coil length) which is longer than the spacing between the one side surface of the corresponding vane 32b and the confronting side surface of the adjacent shoe 34a.

The two coil springs 55 and 56 are spaced with such an interaxis distance that the springs 55 and 56 do not contact each other even when the springs 55 and 56 are compressed to the maximum extent. The two coil springs 55 and 56 are connected through a retainer shaped like a thin sheet and fit in the recesses 32c of the corresponding shoe 34a. The spring forces of the coil springs 55 and 56 are set at a small level. In a cranking operation, the vane member 32 tends to be left behind on the retard side because of the sliding friction of vane member 32. Coil springs 55 and 56 are set to have a spring force to push back the vane member 32 to a position at or near a middle position or an intermediate position.

The thus-constructed valve timing control mechanism 2 is operated as follows: At the time of stop of the engine, the controller 22 stops the output of the control current to selector valve 47, and the valve element connects the supply passage 45 with second pressure passage 44. However, the engine speed is reduced to zero, the oil pressure of oil pump 49 is decreased, and the supply pressure is decreased to zero.

Since timing sprocket 30 is rotating in the clockwise direction in FIG. 7 immediately before the engine stop, the vane member 32 is liable to be left behind on the retard side (in the counterclockwise direction) because of the friction between vane member 32 and housing 34. Though the coil springs 55 and 56 apply their springs forces to urge the vane member 32 to the advance side, their spring forces are not so strong as to force the vane member up to the most retarded position, so that vane member 32 is held stably at an intermediate position closer to the retard side.

Figure 10:
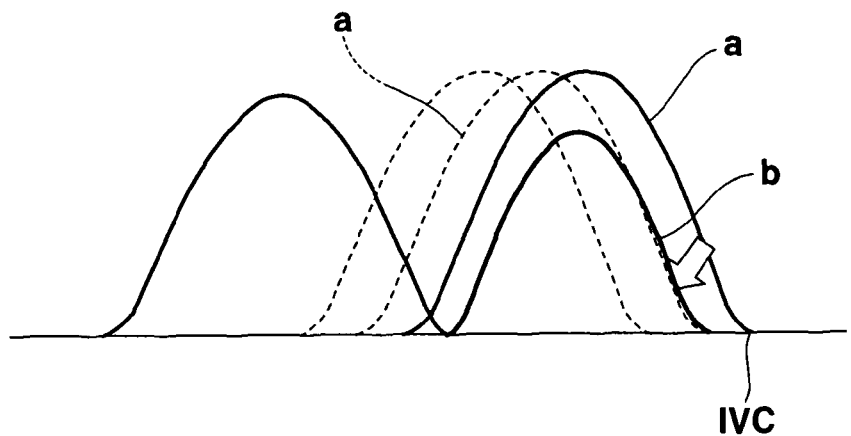
FIG. 10 is a graphic diagram illustrating a corrective operation to shift the intake valve closing timing, performed by the controller with the valve lift varying mechanism according to the control process of FIG. 9.

When the engine is started by turning on the ignition switch and cranking the crank shaft 02 with starter motor 07, the vane member 32 is held at the intermediate position as shown in FIG. 10 at this time point, so that the intake valve closing timing (IVC) is located near the bottom dead center, and the effective compression ratio is higher. Therefore, the valve timing control mechanism 2 can provide a sufficient startability of the engine, and improve the cold engine emission with a proper valve overlap.

When the engine is warmed up thereafter, the controller 22 changes over the selector valve to the position connecting the supply passage 45 with second pressure passage 44, and connecting the drain passage 46 with first pressure passage 43. Therefore, the oil pressure from oil pump 49 is supplied through second pressure passage 44 to retard chambers 42, while the advance chambers 41 are held in a low pressure state in which no oil pressure is supplied, and the oil pressure is drained through drain passage 46 into oil pan 48.

Therefore, vane member 32 is rotated in the counterclockwise direction by the increased pressures in retard chambers 42, against the spring forces of coil springs 55 and 56, as shown in FIG. 8. Consequently, drive shaft 6 rotates to the retard side, relative to timing sprocket 30, and the intake valve closing timing of intake valves 4 is retarded as shown by a solid line in FIG. 10. Thus, the valve timing control mechanism 2 can improve the combustion by decreasing the valve overlap, and stabilize the idling rotation of the engine.

When, thereafter, the vehicle starts moving, and the engine enters a predetermined low speed medium load region, then the controller 22 operates the selector valve 47 to the position connecting the supply passage 45 with first pressure passage 43 and connecting the drain passage 46 with second pressure passage 44.

Therefore, the oil pressure in retard chambers 42 is decreased by return through second pressure passage 44 and drain passage 46 to oil pan 48, whereas the oil pressure in advance chambers 41 is increased by supply of the oil pressure.

Vane member 32 rotates in the clockwise direction by the high pressure in advance chambers 41 and the spring forces of coil springs 55 and 56, and thereby shift the relative rotational phase of drive shaft 6 relative to timing sprocket 30 to the advance side. On the other hand, the operation angle of intake valves 4 is increased slightly by the valve lift varying mechanism 1. Thus, by increasing the valve overlap between the intake valves 4 and exhaust valves 5, the variable valve actuating system can decrease the pumping loss and improve the fuel consumption.

When the engine speed increases from the low speed region, through a normal medium speed region, into a high speed region, the vane member 32, the oil pressure in advance chambers 41 decreases, the oil pressure in retard chambers 42 increases, and hence the vane member 32 shifts the relative rotational phase of drive shaft 6 relative to timing sprocket 30 to the retard side, against the spring forces of coil springs 55 and 56, as shown in FIG. 7. Therefore, in cooperation with a greatest lift control of the valve lift varying mechanism 1, the variable valve actuating system can retard the intake valve closing timing sufficiently while maintaining the valve overlap at an adequate level, and thereby improve the engine output by improving the fresh air intake charging efficiency.

Figure 9:
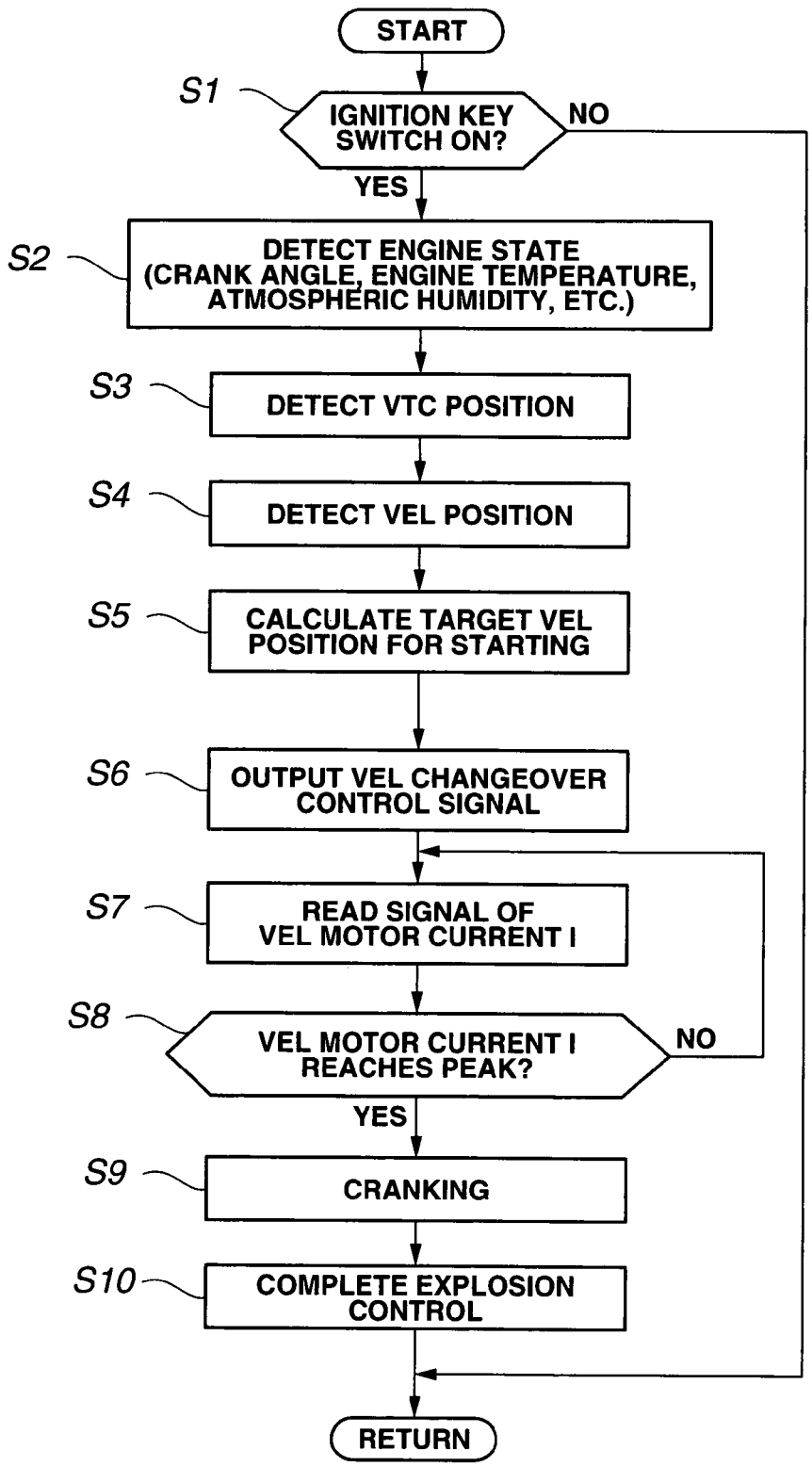
FIG. 9 is a flow chart showing a control process performed by a controller in the variable valve actuating system of FIG. 1.

FIG. 9 shows a control process performed by the controller 22 to improve the startability.

At a step S1, controller 22 examines whether the ignition key switch is on or not. When the ignition key switch is not on, controller 22 proceeds directly to a last step of return since the engine is in the stop state. When the ignition key switch is on, controller 22 proceeds to a step S2.

At step S2, controller 22 detects a current engine operating state by reading signals on information including a current engine speed (rpm) N derived from the crank angle sensor 27, an engine main body temperature (or engine temperature) T1 from an engine coolant temperature sensor, an atmospheric humidity H1 from an atmospheric humidity sensor, etc.

At a step S3, controller 22 detects a current operating or actuating position (VTC position) of variable valve timing control mechanism 2 from information on angular positions supplied from the crank angle sensor 27 and drive shaft angle sensor 28 (absolute angle sensor).

At a step S4, controller 22 detects a current operating or actuating position (current VEL position) of the valve lift varying mechanism 1 or a current operation angle (lift), from information on angular position supplied from the control shaft angle sensor 29.

At a step S5, controller 22 calculates a desired target VEL position of valve lift varying mechanism 1 to achieve a desirable startability, on the basis of the current VTC position of valve timing control mechanism 2. At a step S6, controller 22 delivers a current to the motor 20 to control or change over the valve lift varying mechanism 1 to the target VEL position.

If the operating or actuating position of valve timing control mechanism 2 deviates from an expected position due to malfunction, for example, the control system thus corrects the actuating position of lift varying mechanism 1 to the target position in this way in anticipation of such a deviation.

In an example shown in FIG. 10, the opening and closing timings of intake valves 4 are deviated, as show by a solid line "a" to the retard side of desired positions (shown by a broken line "a"), and the intake valve closing timing (IVC) is on the retard side with respect to the desired position (broken line "a"). In such a case, there is a possibility of the startability being degraded by a decrease of the effective compression ratio. Therefore, the control system decreases the operation angle as shown by a solid line "b" with lift varying mechanism 1, and thereby corrects the position of lift varying mechanism 1 to the target position to advance the closing timing IVC of intake valves 4. Thus, the control system can improve the startability by increasing the effective compression ratio and increasing the intake air quantity with the control action of S6.

Moreover, when the engine temperature T1 becomes lower, the intake air quantity (volume) required to start the engine becomes greater because the mechanical friction increases as the engine temperature T1 decreases. When, on the other hand, the atmospheric humidity H1 is higher, the torque decreases, and hence the intake air quantity (volume) required to start the engine increases. A correction value of the required intake air quantity (volume) is further determined in accordance with the temperature T1 and humidity H1, and the closing timing IVC is further corrected in accordance with the correction value. In this way, the control system calculates, as the target, the position of lift varying mechanism 1 to attain an ideal valve timing, in accordance with the engine temperature T1 and atmospheric humidity H1, by using the current closing timing IVC position as the premise. (It is possible to take into account one or more parameters other than the valve closing timing IVC. Moreover, it is possible to perform an emission reduction control with a valve overlap.)

After S6, controller 22 reads the current I to the electric motor 20 at a step S7, and examines, at a step S8, whether the current I reaches or passes a peak.

Figure 11:
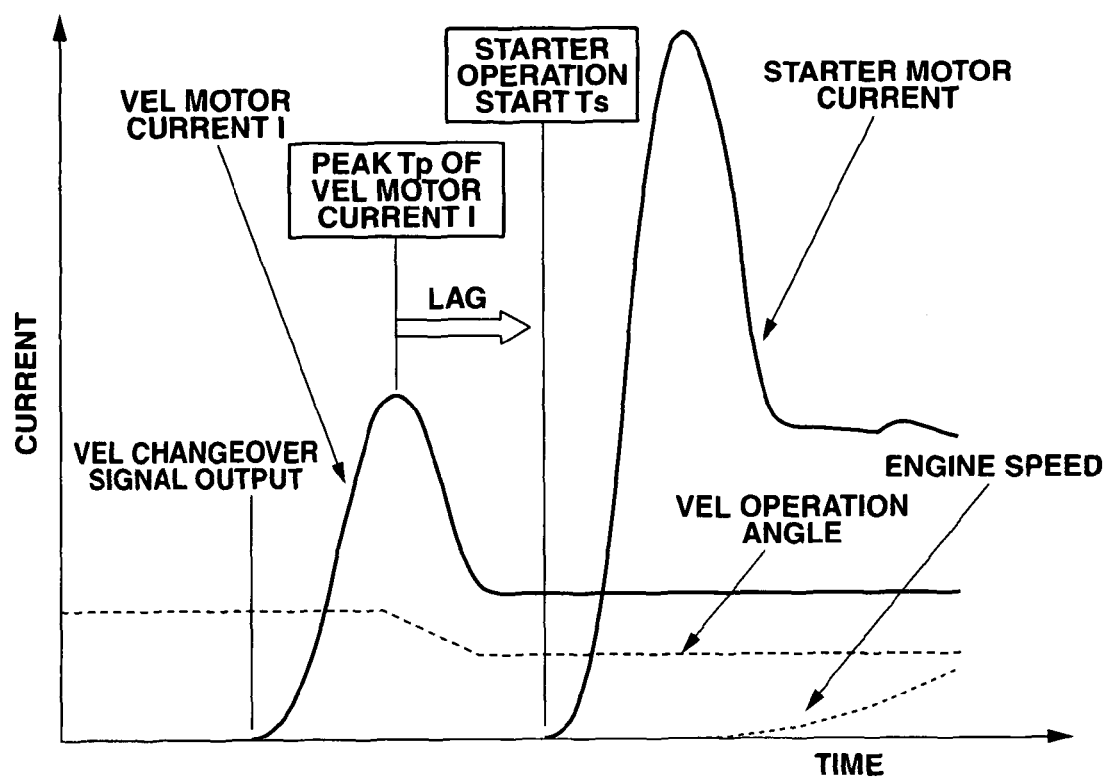
FIG. 11 is a characteristic view showing a characteristic between a current and time, for illustrating a control operation of the controller to shift the peak position of a current for an electric motor of the valve lift varying mechanism away from the peak position of a current for a starter motor.

From S8, controller 22 returns to S7 when a peak is not yet reached by the current I. When the judgment is that the current I has passed or reached a peak, then the controller 22 proceeds to a step S9. At S9, controller 22 starts an engine cranking operation by energizing the starter motor 07. Thus, as shown in FIG. 11, the control system starts the cranking by supplying the electric power to starter motor 07 at an instant at which the current I to the electric motor 20 has passed a peak Tp of the current I for the electric motor 20 of lift varying mechanism 1. Therefore, the control system can alleviate the load on the battery power source by preventing coincidence of the peak of the current for the electric motor 20 and the peak Tp of the current I for the starter motor.

At a step S10 following S9, controller 22 performs a complete explosion control to control the fuel injection and ignition when the cranking is started and the rotational speed of the crank shaft 02 is increased, and thereby completes a smooth cranking operation.

Figure 12:
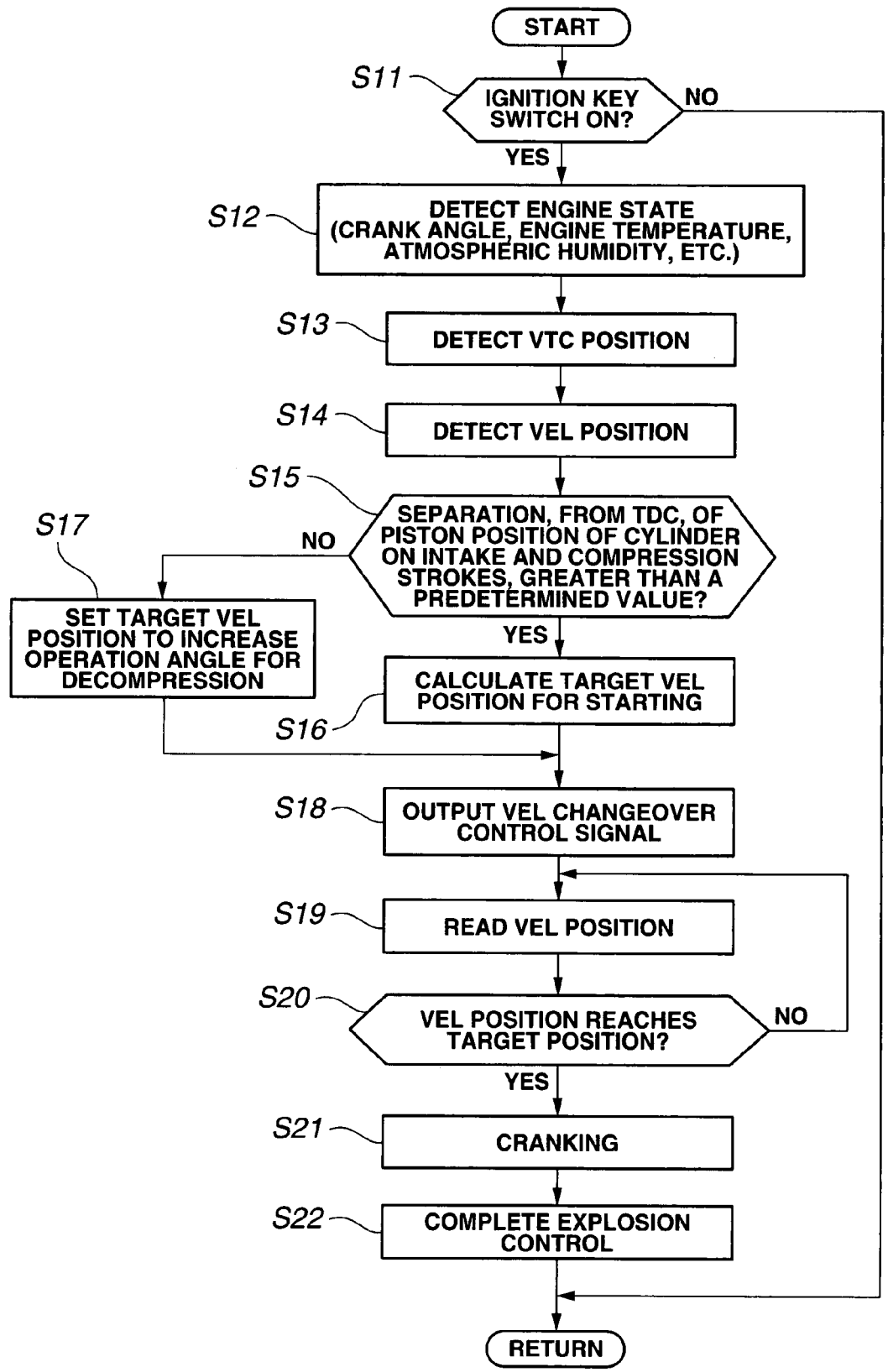
FIG. 12 is a flow chart showing a control process performed by the controller according to a second embodiment of the present invention.

FIG. 12 shows a control process performed by controller 22 according to a second embodiment of the present invention, which is adequate especially when starting vibrations is liable to occur as in warm-up starting. Steps S11~S14 are substantially identical to steps S1~S4. That is, controller 22 examines whether the ignition key switch is on at S11; detects the current engine state at S12 when the ignition key switch is on; and detects the current positions of valve timing control mechanism 2 and valve lift varying mechanism 1 at S13 and S14.

At a step S15, controller 22 checks the position of the piston in at least one cylinder on the intake stroke or the compression stroke by using the current crank angle read from crank angle sensor 27, and examines whether the piston position on the intake stroke or the compression stroke is away from the bottom dead center by a separation (or distance) greater than or equal to a predetermined value. When the separation of the piston position from the bottom dead center is greater than or equal to the predetermined value, that is, when the crank stop position is a normal position Q as shown in FIG. 13, then the controller 22 calculates, at a step S16, the target VEL position of lift varying mechanism 1 adapted to the engine starting operation in the same manner as in step S5.

Figure 13:
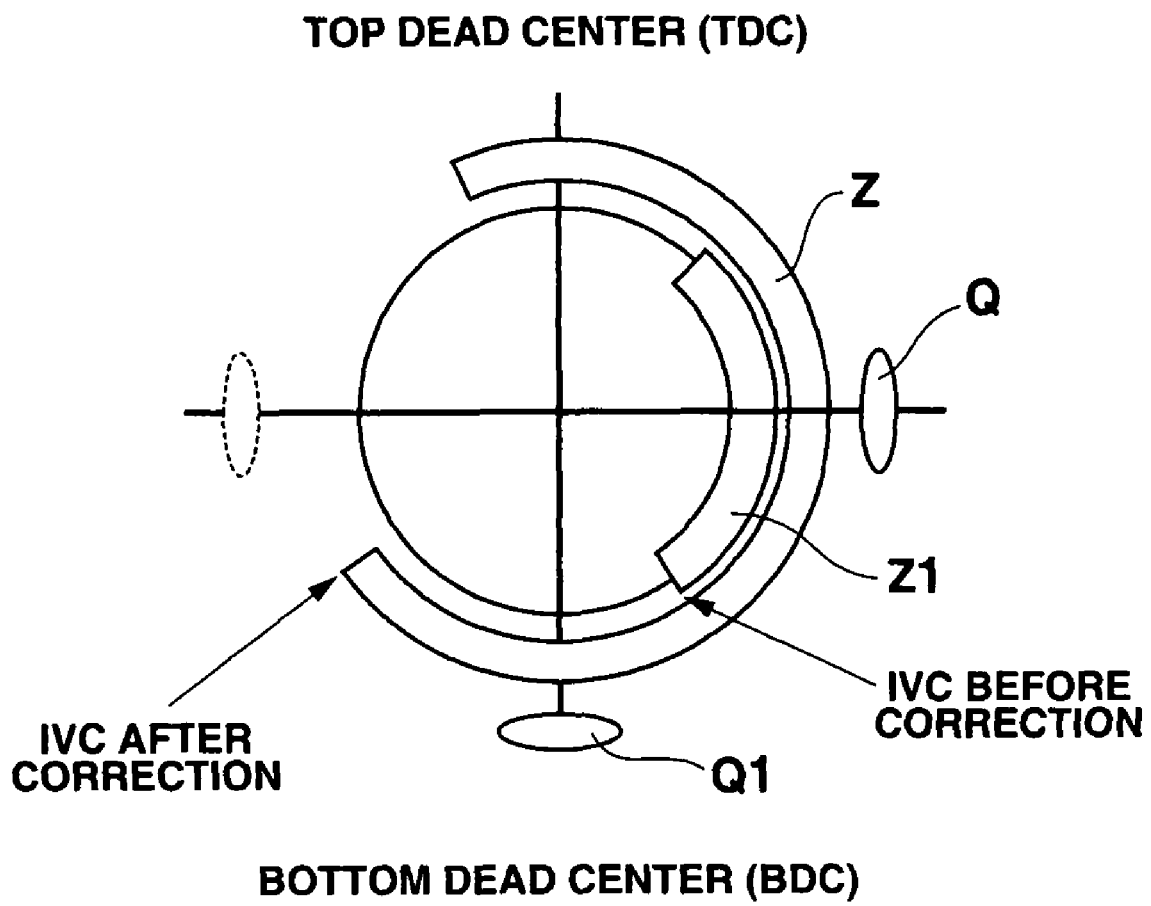
FIG. 13 is a characteristic view illustrating a corrective operation performed by the controller according to the second embodiment to shift the intake valve closing timing with an operation angle control of the lift varying mechanism at the time of cranking.

When the separation of the piston position on the intake or compression stroke from the bottom dead center is smaller than the predetermined value, and the piston position is at or near the bottom dead center (when the crank stop position is an abnormal position Q1 as shown in FIG. 13), then the controller 22 proceeds from S15 to a step S17.

At step S17, controller 22 determines the target VEL position of lift varying mechanism 1 so as to increase the operation angle of intake valves 4 to a greater angle Z as shown in FIG. 13 by energizing the electric motor 20. When the piston is located at or near the bottom dead center, the operation angle of intake valves 4 is set at a smaller angle Z1 as shown in FIG. 13, and the valve closing timing IVC of intake valves 4 is separated from the bottom dead center. Therefore, during the engine stoppage, air enters the cylinder. If the engine is cranked in this state, the compression tends to become excessive in a first cranking operation, resulting in strong vibrations.

Therefore, with S17, the control system can control the operating angle of intake valves 4 to the desired larger angle Z with lift varying mechanism 1 under the condition of the current position of valve timing control mechanism 2, and thereby retards the intake valve closing timing IVC with respect to the bottom dead center. Consequently, the intake valves 4 are held open near the bottom dead center, and the compression starts at the intake valve closing timing IVC retarded after the bottom dead center. In this way, the control system can prevent vibrations by decreasing the compression.

At a step S18 following S17 or S16, controller 22 delivers a current to the motor 20 to control or change over the lift varying mechanism 1 to the target VEL position determined at S16 or S17.

At a step S19, controller 22 reads the current VEL position of lift varying mechanism 1 adjusted by the operation of motor 20, and sensed by control shaft angle sensor 29.

At a step S20, controller 22 examines whether the VEL target position is reached or not. Controller 22 returns to S19 when the lift varying mechanism 1 has not yet reached the target VEL position, and proceeds to a step S21 when the lift varying mechanism 1 has reached the target VEL position.

At S21, controller 22 starts the engine cranking operation by energizing the starter motor 07. At a step S22, controller 22 performs the fuel injection and ignition and performs the complete explosion control with the valve timing suitable for the first cranking. Therefore, the control system can ensure the starting performance of higher accuracy.

Figure 14:
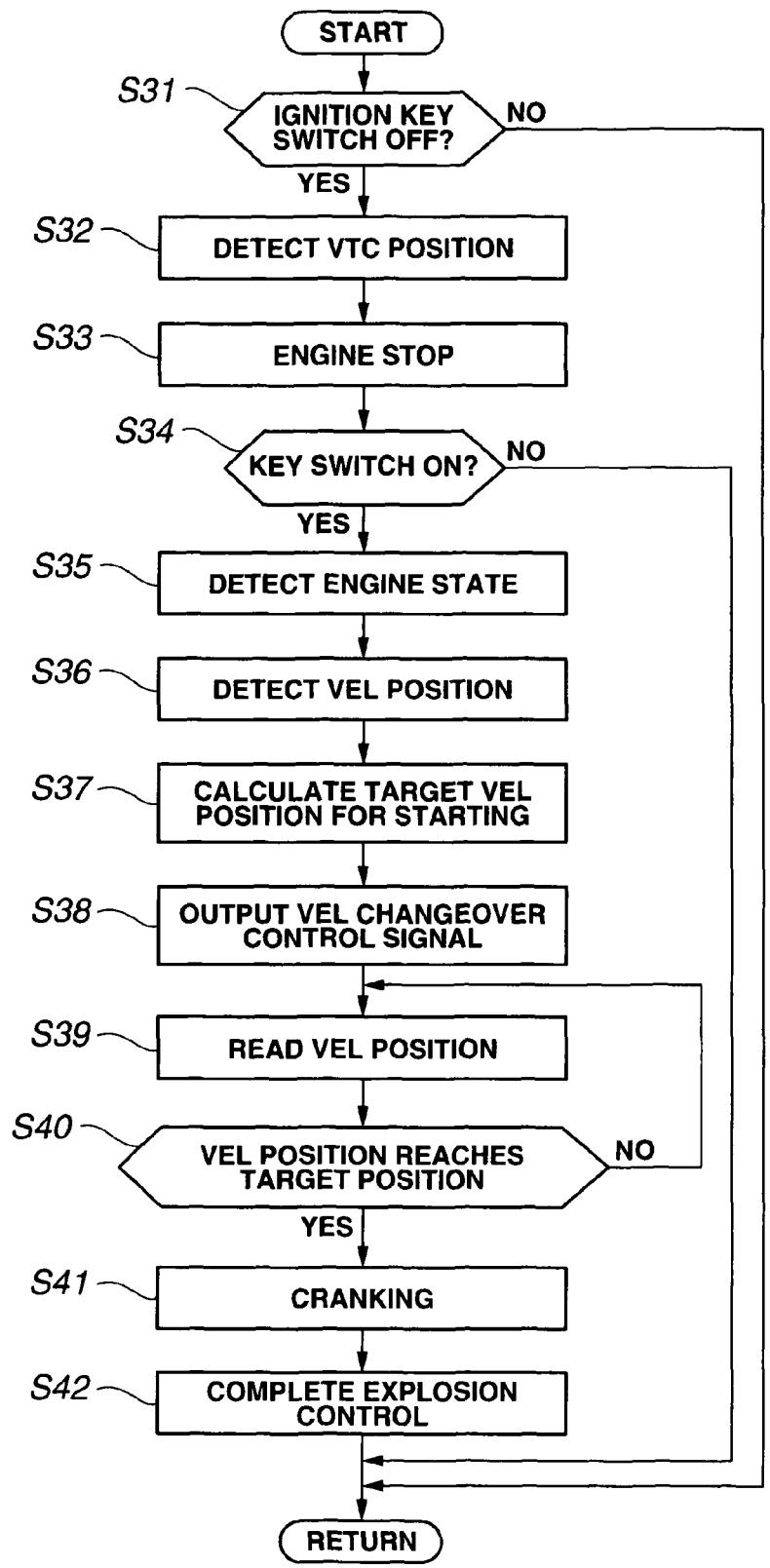
FIG. 14 is a flow chart showing a control process performed by the controller according to a third embodiment of the present invention.
Figure 15:
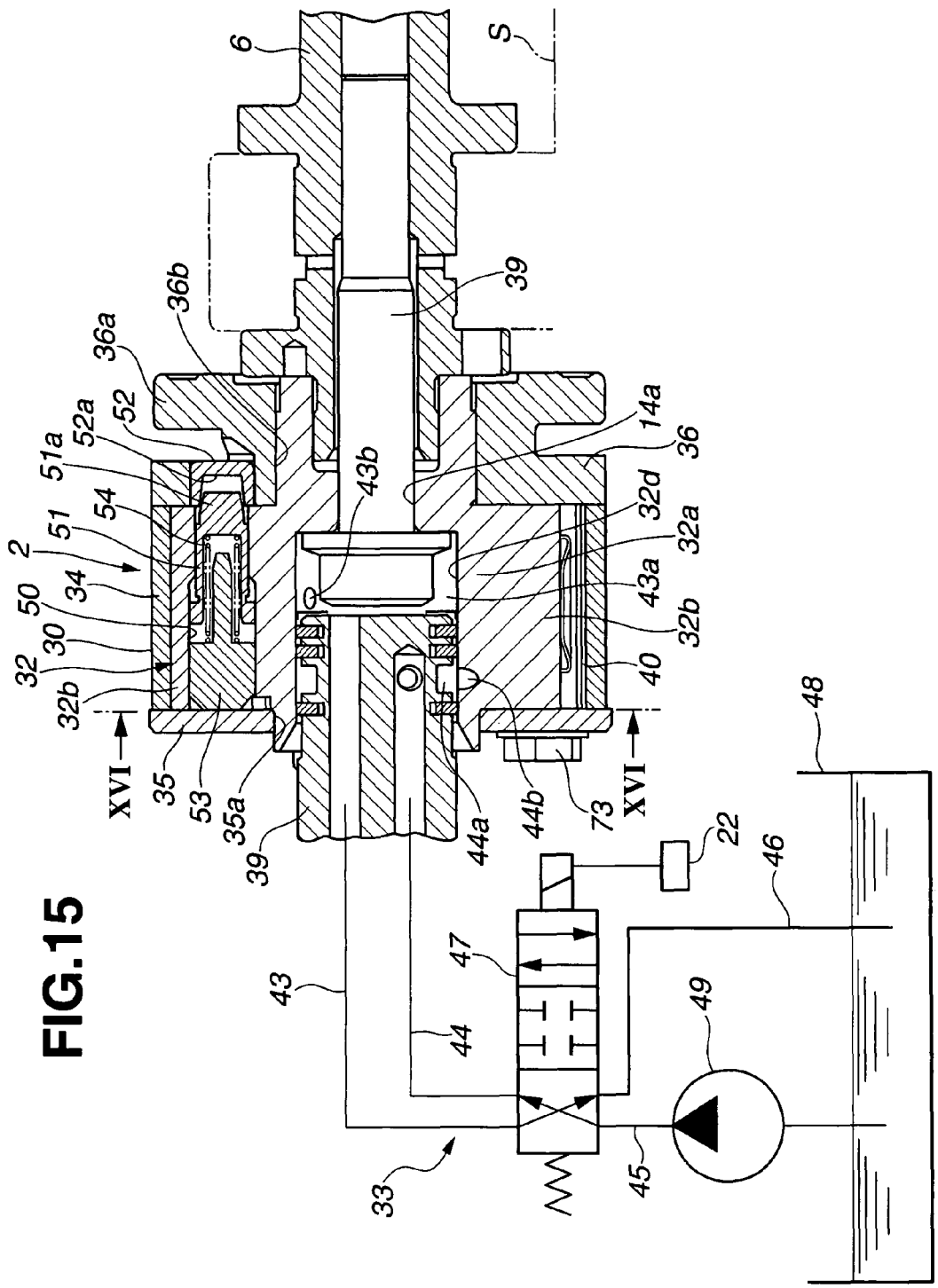
FIG. 15 is a sectional view showing a valve timing control mechanism according to a fourth embodiment of the present invention.

FIG. 14 shows a control process performed by controller 22 according to a third embodiment of the present invention. Instead of performing the detection of the position of valve timing control mechanism 2 before a cranking operation, the control system according to the third embodiment is arranged to perform the detection of the position of valve timing control mechanism 2 immediately before a preceding stoppage of the engine. At the time of detection of the position, drive shaft 6 is rotating unlike the preceding embodiments.

During a previous engine operation, the control system detects the position of valve timing control mechanism 2 properly with a trigger type sensor, and stores the data of the detected position preliminarily in a memory of controller 22.

At a step S31, controller 22 examines whether the ignition key switch is off or not. When the ignition key switch is turned off, the controller 22 proceeds to a step S32, and detects the current position of valve timing control mechanism 2 by comparing the signal from the trigger type pickup sensor with the signal of crank angle sensor 27 immediately after the turn-off of the ignition key switch, and stores the data on the detected position in the memory. The data on the detected position of valve timing control mechanism 2 is preserved in the memory of controller 22 after the stop of the engine.

At a step S33, controller 22 stores a most recent value of the detected position of valve timing control mechanism 2 as the position of valve timing control mechanism 2 if the engine is stopped abruptly as in an engine stall.

At a step S34 following S33, controller 22 examines whether the ignition key switch is on or not. When the ignition key switch is not on, controller 22 proceeds directly to the end of this process for the return operation since the engine is still in the stop state. When the ignition key switch is on, controller 22 proceeds to a step S35.

Then, controller 22 detects the current engine operating state at step S35, by reading the signals from the various sensor as in steps S2 and S12; detects the current operating or actuating position (current VEL position) of lift varying mechanism 1 at a step S36 as in steps S4 and S14; and calculates the target VEL position of lift varying mechanism 1 to achieve a desirable startability, by assuming, as a premise, the VTC position of valve timing control mechanism 2 which has been detected at S32 and stored at the time of the previous engine stoppage.

Thereafter, controller 22 controls the motor 20 of lift varying mechanism 1 to achieve the target VEL position and then performs the cranking operation at steps S38~S42 in the same manner as steps S18~22.

In the third embodiment, therefore, it is possible to employ, as the position sensor of valve timing control mechanism 2, a trigger sensor capable of sensing at time intervals during rotation, instead of a costly absolute angle sensor, and thereby to reduce the production cost.

FIGS. 15~18 are views for showing a variable valve actuating system according to a fourth embodiment of the present invention in which there is provided, between the vane member 32 and housing 34, a lock mechanism serving as means for locking and unlocking vane member 32 to prevent and allow the rotation of vane member 32 relative to housing 34.

This lock mechanism is disposed between the larger vane 32a having the larger width and the rear cover 36. The lock mechanism includes a lock pin 51 slidably received in a slide hole 50 formed in the larger vane 32b and arranged to engage in a lock hole 52a formed in a lock hole member 52 fixed in a fixing hole of rear cover 36; and a spring member 54 retained by a spring retainer 53 fixed in the slide hole 50 of larger vane 32b and arranged to urge the lock pin 51 toward lock hole 52a. Slide hole 50 extends in the axial direction of drive shaft 6. Lock pin 51 is a cup-shaped member in the form of a hollow cylinder extending axially from an open end to a closed forward end 51a which is tapered. The lock hole member 52 is a cup-shaped member fixed in rear cover 36 and formed with the lock hole 52a adapted to receive the tapered forward end 51a of lock pin 51 snugly. Lock pin 51 is located axially between the spring retainer 53 and the lock hole member 52. Spring member 54 is disposed between spring retainer 53 and lock pin 51 and arranged to urge the lock pin 51 axially toward the lock hole 52a.

The lock hole 52a is so arranged that the fluid pressure in the retard chambers 42 is supplied into lock hole 52a through a fluid (oil) passage (not shown).

Figure 16:
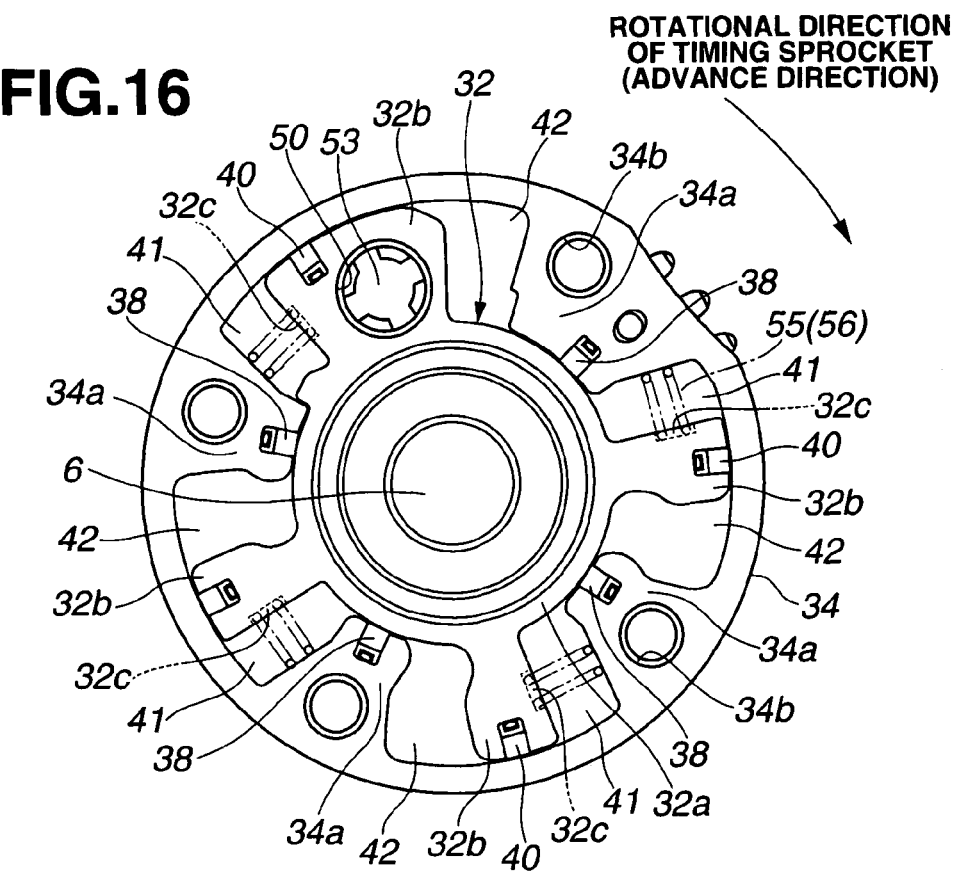
FIG. 16 is a sectional view taken across a line XVI-XVI in FIG. 15, showing the valve timing control mechanism controlled in an intermediate position.
Figure 19:
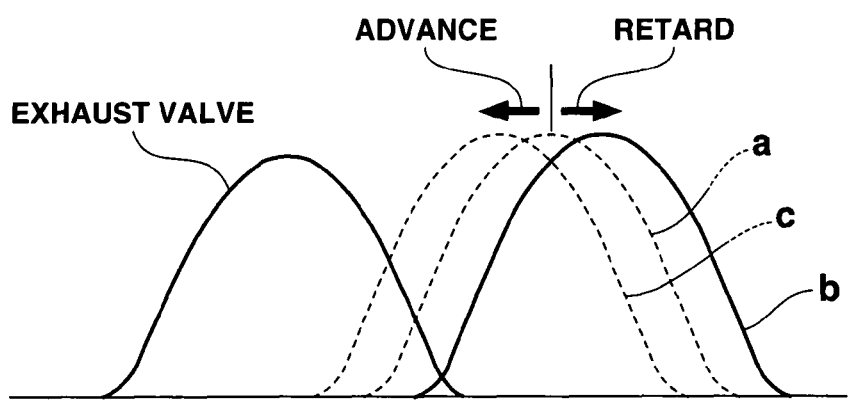
FIG. 19 is a characteristic view illustrating the intake valve opening and closing phase in the control positions shown in FIGS. 16-18.

In the engine stop state at the time of starting the engine, the vane member 32 is located, as shown in FIG. 16, at an intermediate angular position or approximately middle position between the most advanced angular position and the most retarded angular position, and the lock pin 51 is urged by spring member 54 and engaged in the lock hole 52a, so that the vane member 32 is held in the lock state in which the relative rotation between timing sprocket 30 and drive shaft 6 is prevented. In this lock state, the opening and closing phase (or the closing timing) of intake valves 4 is held at a relatively advanced intermediate position as shown by a broken line "a" in FIG. 19. Therefore, the variable valve actuating system can improve the startability in a cold start operation by increasing the effective compression ratio, and improve the emission with an adequate valve overlap.

Figure 17:
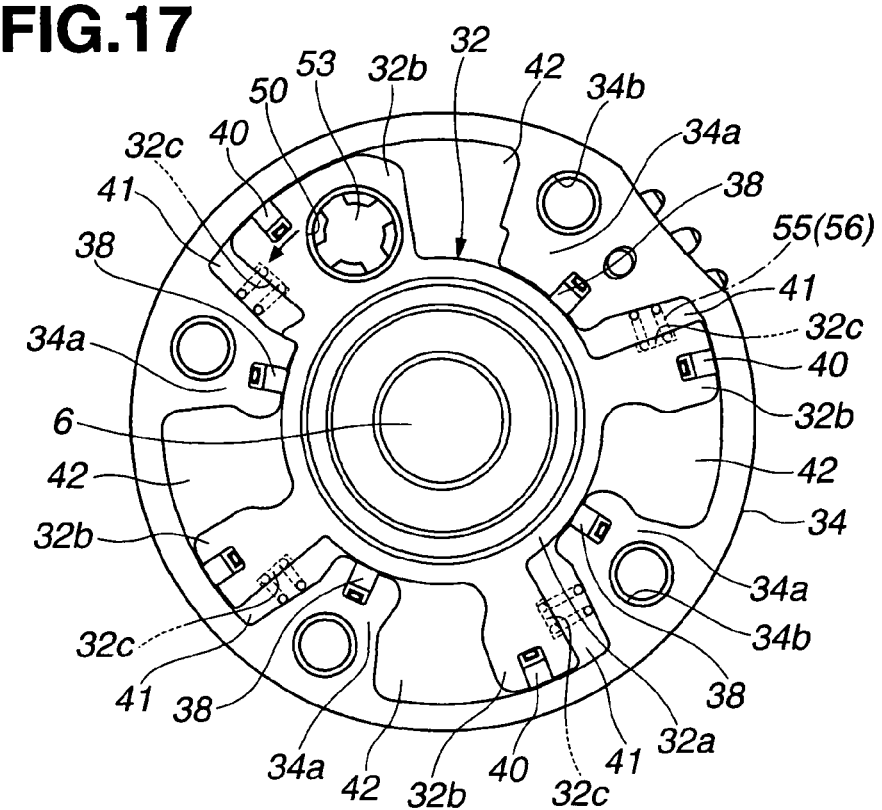
FIG. 17 is a sectional view taken across the line XVI-XVI in FIG. 15, showing the valve timing control mechanism controlled in a most retarded position.
Figure 18:
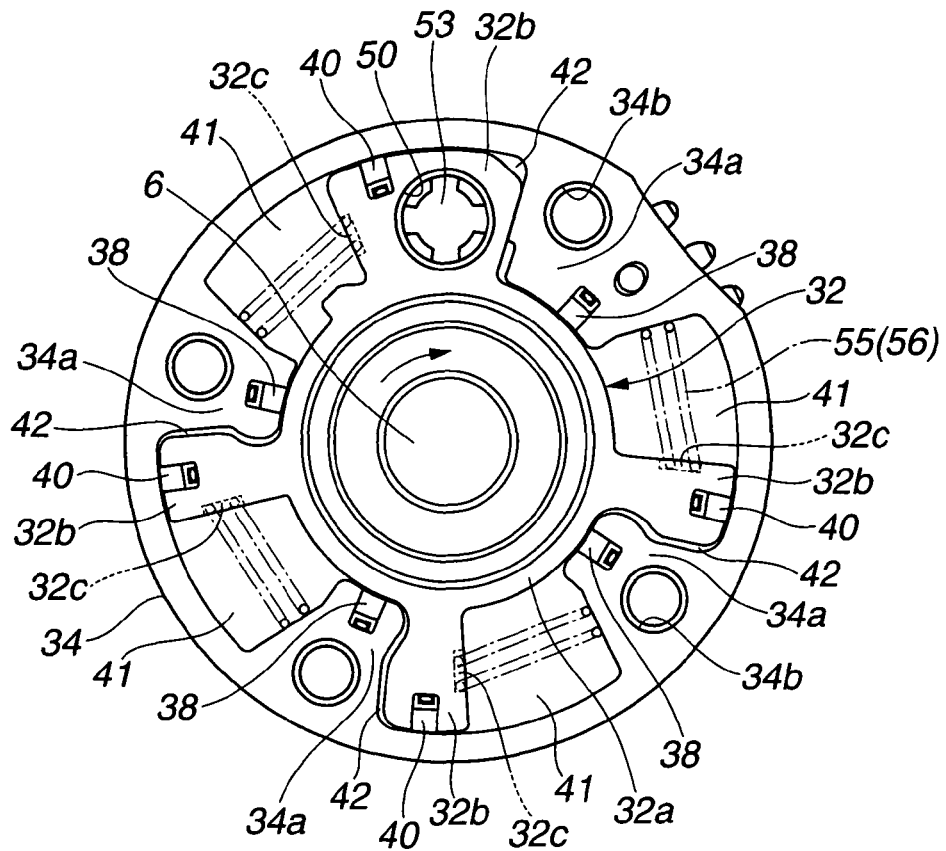
FIG. 18 is a sectional view taken across the line XVI-XVI in FIG. 15, showing the valve timing control mechanism controlled in a most advanced position.

In an warm-up idling operation after a start of the engine, the fluid pressure is supplied to retard chambers 42 and the fluid pressure is further supplied into lock hole 52a, so that lock pin 51 retreats against the spring force of spring member 54 and the forward end 51a moves out of lock hole 52a to unlock the vane member 32. Therefore, vane member 32 rotates relatively toward the most retarded position, as shown in FIG. 17, and hence the intake valve opening and closing phase is shifted to the most retarded phase as shown by a solid line "b" in FIG. 19. Thus, the variable valve actuating system can decrease the valve overlap and stabilize the idling rotation.

In the low speed medium load engine operating region, the operating oil is drained from retard chambers 42 and instead supplied into advance chambers 41, so that vane member 32 rotates toward the most advanced position. Therefore, the intake valve opening and closing phase is shifted to the most advanced phase as shown by a broken line "b" in FIG. 19. Thus, the variable valve actuating system can increase the valve overlap and improve the fuel consumption by decreasing the pumping loss.

If, at the time of an engine stop (cold start), for example, the lock pin 51 fails to engage in the lock hole 52a, and hence the valve timing control mechanism 2 is in a state inadequate for an engine start, the controller 22 controls the operation of the valve lift varying mechanism 1 to shift the intake valve closing timing in the advance or retard direction, to a timing position suitable for an engine start, such as an IVC position corresponding to the above-mentioned intermediate position. Thus, the variable valve actuating system can improve the engine startability by improving the effective compression ratio, and improve the emission by controlling the valve overlap.

The present invention is not limited to the illustrated embodiments. Instead of the valve lift varying mechanism 1, for example, it is possible to employ, as the first valve actuating mechanism, various other actuating mechanisms capable of varying an engine valve operating condition at the time of engine stop or cranking. For example, it is possible to employ a valve timing varying mechanism powered by an electric motor, as disclosed in a published Japanese patent application publication No. 2003-35115.

Moreover, instead of the valve timing control mechanism 2, it is possible to employ, as the second valve actuating mechanism, various other actuating mechanisms. For example, it is possible to employ a hydraulic type variable valve lift mechanism disclosed in a published Japanese patent application publication No. 2006-29245.

In the illustrated embodiments, the first and second valve actuating mechanisms are both provided on the intake side. However, it is possible to employ an arrangement in which one of the first and second valve actuating mechanisms is on the intake side, and the other is on the exhaust side. For example, it is possible to employ a variable valve actuating system including an electric valve timing control mechanism A provided on the intake valve's side and operated by an electric motor, and a hydraulic valve timing control mechanism B provided on the exhaust valve's side and operated by an oil pressure. In this case, it is possible to rearrange the control process of FIG. 9 so that the lift varying mechanism 1 is replaced by the electric valve timing control mechanism A on the intake valve's side, and the valve timing control mechanism 2 is replaced by the hydraulic valve timing control mechanism B on the exhaust valve's side. The controller 22 can control the electric valve timing control mechanism A before or during cranking so as to achieve a desired valve overlap quantity on the basis of the position of the valve timing control mechanism B.

The illustrated embodiments employ, as the engine operating condition, the temperature of the engine main body (the temperature of the engine cooling water or coolant) and the crank angle. However, it is possible to employ the temperature of some other portion, and some other parameter or operating condition. As an atmospheric condition, it is possible to employ an atmospheric pressure exerting influence on the engine output torque, instead of or in addition to, the atmospheric humidity.

In an variable valve actuating apparatus according to one aspect of the present invention, the controller is configured to detect an actuating position of the second valve actuating mechanism immediately before the cranking operation. Therefore, the apparatus can detect the actuating position of the second valve actuating mechanism in an accurately manner free from variation with time of the actuating position, and thereby determine the desired target position for the first valve actuating mechanism accurately.

In an variable valve actuating apparatus according to another aspect of the present invention, the controller is configured to detect an actuating position of the second valve actuating mechanism during rotation of the engine before a previous stop of the engine. Therefore, the apparatus can employ an uncostly trigger sensor arranged to sense the actuating position of the second actuating mechanism from the timing of passage of a predetermined phase during rotation, instead of a costly absolute angle sensor, so that it is possible to reduce the production cost.

The controller may be configured to determine a (first) desired target position of the first valve actuating mechanism so as to compensate for a separation of an actuating position of the second valve actuating mechanism at the time of an engine stop, from a desired reference stop position (a second desired target position) of the second valve actuating mechanism, and to control the first valve actuating mechanism to the (first) desired target position when the actuating position of the second valve actuating mechanism is away from the desired reference stop position. Therefore, the system can ensure the satisfactory startability even when there is such a separation.

The controller may be configured to control the first valve actuating mechanism with respect to the engine operating condition which is determined from the crank angle of the engine before the cranking operation. In this case, the system can prevent deterioration of the engine startability which would be caused by a difference in the crank angle.

When the crank angle in at least one cylinder on the intake stroke or the compression stroke is at or near the bottom dead center, the controller may set a desired target position of the first valve actuating mechanism to the position at which an intake vale is open at the crank angle in that cylinder, and control the first valve actuating mechanism to the desired target position. Therefore, the system can discharge the atmospheric air accumulated in the cylinder through the intake valve at the time of a first cranking operation. By so doing, the system can reduce noises, and increase the cranking rotational speed by the effect of decompression.

In determining the desired target position of the first valve actuating mechanism, the controller may take account of the atmospheric condition in addition to the actuating position of the second valve actuating mechanism before the cranking operation, and the engine operation condition. In this case, the system can ensure the good startability even when the atmospheric condition is changed at the time of an engine start.

When the first valve actuating mechanism is an electric type mechanism, the controller may deliver a changeover signal to the first valve actuating mechanism to control the first valve actuating mechanism to a desired target position before a cranking operation and allow the cranking operation with an electric starter motor after a current of the changeover signal reaches a current peak. In this case, the system can reduce the load imposed on a battery by preventing coincidence of the current peak of the starter motor and the current peak of an electric motor of the first actuating mechanism.

The first valve actuating mechanism may be provided on the intake side of the engine whereas the second valve actuating mechanism may be provided on the exhaust side of the engine. In this case, even when the valve overlap is in a condition unsuitable for an engine start, the system can perform a corrective operation with the first valve actuating mechanism.

The controller may be configured to examine a separation of a piston position of the engine from a bottom dead center in one cylinder on one of a compression stroke and an intake stroke, and to determine the desired target position of the first valve actuating mechanism in dependence on the separation. The controller may be further configured to examine the separation of the piston position of the engine from the bottom dead center in one cylinder on one of the compression stroke and the intake stroke, and to determine the desired target position of the first valve actuating mechanism normally in a first mode (at S16, for example) and in a second mode (at S17, for example) different from the first mode when the separation is smaller than a predetermined value. The controller may be further configured to determine the desired target position of the first valve actuating mechanism normally in the first mode to decrease an intake valve operation angle and in the second mode to increase the intake valve operation angle when the separation is smaller than the predetermined value.

This application is based on a prior Japanese Patent Application No. 2006-161760 filed on Jun. 12, 2006. The entire contents of this Japanese Patent Application No. 2006-161760 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve actuating apparatus for an internal combustion engine, comprising:
    a first valve actuating mechanism configured to vary a first valve operating condition of the engine;
    a second valve actuating mechanism configured to vary a second valve operating condition of the engine; and
    a controller configured to control the first valve actuating mechanism to satisfy a predetermined engine starting condition of the engine before an end of a cranking operation of the engine, with respect to an engine operating condition of the engine including the second valve operating condition controlled by the second valve actuating mechanism;
    wherein the first valve actuating mechanism includes an actuating device to control the first valve operating condition of an engine valve of the engine during a stop of the engine or during a cranking operation; the second valve actuating mechanism is arranged to vary the second valve operating condition of the engine valve separately from the first valve actuating mechanism; and the controller is configured to control an actuating condition of the first valve actuating mechanism to a desired target condition to satisfy the predetermined engine starting condition of the engine before a start of the cranking operation or during the cranking operation of the engine, with respect to the engine operating condition including the second valve operating condition controlled by the second valve actuating mechanism before the start of the cranking operation.

2. The variable valve actuating apparatus as claimed in claim 1, wherein the first valve actuating mechanism includes a valve operation angle varying mechanism arranged to continuously vary the first valve operating condition which is a valve operation angle of an engine valve of the engine; the second valve actuating mechanism includes a valve timing control mechanism arranged to continuously vary the second valve operating condition which includes valve opening and closing timings of the engine valve; and the controller is configured to control the operation angle of the engine valve with the first valve actuating mechanism so as to satisfy the predetermined engine starting condition of the engine before a start of the cranking operation or during the cranking operation of the engine, with respect to the engine operating condition including a phase of the valve opening and closing timings set by the second valve actuating mechanism before the start of the cranking operation.

3. The variable valve actuating apparatus as claimed in claim 1, wherein the first valve actuating mechanism is arranged to continuously vary the first valve operating condition which includes a valve timing of the engine; the second valve actuating mechanism is arranged to continuously vary the second valve operating condition which is a valve operation angle of the engine; and the controller is configured to output a control signal to control a phase of the valve timing of the engine, to the first valve actuating mechanism so as to satisfy the predetermined engine starting condition of the engine before a start of the cranking operation or during the cranking operation of the engine, with respect to the engine operating condition including the valve operation angle set by the second valve actuating mechanism.

4. The variable valve actuating apparatus as claimed in claim 1, wherein the controller is configured to detect an actuating position of the second valve actuating mechanism immediately before the cranking operation, and to control the first valve actuating mechanism to a desired target position determined in accordance with the actuating position of the second valve actuating mechanism.

5. The variable valve actuating apparatus as claimed in claim 1, wherein the controller is configured to detect an actuating position of the second valve actuating mechanism during rotation of the engine before a most recent stop of the engine, and to control the first valve actuating mechanism to a desired target position determined in accordance with the actuating position of the second valve actuating mechanism.

6. The variable valve actuating apparatus as claimed in claim 1, wherein the controller is configured to determine a desired target position of the first valve actuating mechanism so as to compensate for a separation of an actuating position of the second valve actuating mechanism at the time of an engine stop, from a desired reference stop position of the second valve actuating mechanism, and to control the first valve actuating mechanism to the desired target position when the actuating position of the second valve actuating mechanism is away from the desired reference stop position.

7. The variable valve actuating apparatus as claimed in claim 1, wherein the controller is configured to control the first valve actuating mechanism with respect to the engine operating condition which is determined from a crank angle of the engine before the cranking operation.

8. The variable valve actuating apparatus as claimed in claim 7, wherein the controller is configured to set a desired target position of the first valve actuating mechanism to a position to open an intake valve when a piston position is at or near a bottom dead center in one cylinder on an intake stroke or a compression stroke, and to control the first valve actuating mechanism to the desired target position.

9. The variable valve actuating apparatus as claimed in claim 1, wherein the controller is configured to determine a desired target position of the first valve actuating mechanism in accordance with an atmospheric condition as well as an actuating position of the second valve actuating mechanism before the cranking operation, and to control the first valve actuating mechanism to the desired target position.

10. The variable valve actuating apparatus as claimed in claim 1, wherein the first valve actuating mechanism includes an electric device to vary the first valve operating condition; and the controller is configured to deliver a changeover signal to the electric device of the first valve actuating mechanism to control the first valve actuating mechanism to a desired target position before the cranking operation and to start the cranking operation with an electric starter motor after a current of the changeover signal reaches a current peak.

11. The variable valve actuating apparatus as claimed in claim 1, wherein the first valve actuating mechanism is provided on an intake side of the engine, and the second valve actuating mechanism is provided on an exhaust side of the engine.

12. A variable valve actuating apparatus for an internal combustion engine, comprising:
    a first valve actuating mechanism to vary a first valve operating condition of the engine;
    a second valve actuating mechanism to vary a second valve operating condition of the engine; and
    a controller configured:
        to detect an actuating position of the second valve actuating mechanism before a start of a cranking operation of the engine,
        to determine a desired target position of the first valve actuating mechanism to achieve a desirable startability in accordance with the actuating position of the second valve actuating mechanism so as to improve the startability of the engine,
        to control the first valve actuating mechanism to the desired target position determined in accordance with the actuating position of the second valve actuating mechanism, and
        to crank the engine after an operation to control the first valve actuating mechanism to the desired target position.

13. The variable valve actuating apparatus as claimed in claim 12, wherein the first valve actuating mechanism is arranged to vary the first valve operating condition which is an operating condition of an intake valve of the engine; and the second valve actuating mechanism is arranged to vary the second valve operating condition which is an operating condition of one of the intake vale and an exhaust valve of the engine.

14. The variable valve actuating apparatus as claimed in claim 12, wherein the first valve actuating mechanism includes an electric actuator to vary the first valve operating condition electrically whereas the second valve actuating mechanism includes a hydraulic actuator to vary the second valve operating condition hydraulically.

15. The variable valve actuating apparatus as claimed in claim 12, wherein the first valve actuating mechanism includes a valve operation angle varying mechanism arranged to vary the first valve operating condition which is a valve operation angle of an intake valve or an exhaust valve of the engine; and the second valve actuating mechanism includes a valve timing control mechanism arranged to vary the second valve operating condition which is a valve timing of the intake valve or the exhaust valve.

16. The variable valve actuating apparatus as claimed in claim 15, wherein the controller is configured to determine the desired target position of the first valve actuating mechanism to decrease the operation angle of the intake valve when the second valve actuating mechanism is at a position to delay an intake valve closing timing.

17. The variable valve actuating apparatus as claimed in claim 12, wherein the controller is configured to determine the desired target position to vary the first valve operating condition of an intake valve in a direction to increase an effective compression ratio of the engine when the second valve actuating mechanism is at a position to decrease the effective compression ratio.

18. The variable valve actuating apparatus as claimed in claim 12, wherein the controller is configured to determine the desired target position to vary the first valve operating condition of an intake valve in a direction to increase an intake air quantity when an engine temperature become lower or an atmospheric humidity becomes higher.

19. The variable valve actuating apparatus as claimed in claim 12, wherein the second valve actuating mechanism comprises a lock mechanism to lock the second valve actuating mechanism normally at a predetermined position when the engine is stopped, and the controller is configured to control the first valve actuating mechanism to the target position if the lock mechanism fails to lock the second valve actuating mechanism at the predetermined position at the time of stop of the engine.

20. The variable valve actuating apparatus as claimed in claim 12, wherein the controller is configured to examine a separation of a piston position of the engine from a bottom dead center, and to determine the desired target position of the first valve actuating mechanism in dependence on the separation.

21. A control process of controlling a variable valve actuating apparatus including a first valve actuating mechanism to vary a first valve operating condition of an internal combustion engine, and a second valve actuating mechanism to vary a second valve operating condition of the engine, the control process comprising:
    detecting an actuating position of the second valve actuating mechanism before a start of a cranking operation of the engine;
    determining a desired target position of the first valve actuating mechanism to achieve a desirable startability in accordance with the actuating position of the second valve actuating mechanism so as to improve the startability of the engine;
    controlling the first valve actuating mechanism to the desired target position determined in accordance with the actuating position of the second valve actuating mechanism; and
    allowing a cranking operation of the engine after an operation to control the first valve actuating mechanism to the desired target position.

* * * * *